(12) United States Patent
Kataoka et al.

(10) Patent No.: US 7,738,062 B2
(45) Date of Patent: Jun. 15, 2010

(54) LIQUID CRYSTAL DISPLAY AND METHOD OF MANUFACTURING THE SAME

(75) Inventors: Shingo Kataoka, Kawasaki (JP); Katsufumi Ohmuro, Kawasaki (JP); Takahiro Sasaki, Kawasaki (JP); Kunihiro Tashiro, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 1023 days.

(21) Appl. No.: 10/985,132

(22) Filed: Nov. 10, 2004

(65) Prior Publication Data

US 2005/0264730 A1    Dec. 1, 2005

(30) Foreign Application Priority Data

May 27, 2004    (JP)    ............................. 2004-157655

(51) Int. Cl.
  G02F 1/1335    (2006.01)
  G02F 1/1337    (2006.01)

(52) U.S. Cl. ........................................ 349/114; 349/191

(58) Field of Classification Search .................. 349/114, 349/123–129, 191
See application file for complete search history.

(56) References Cited

U.S. PATENT DOCUMENTS

| | | | | |
|---|---|---|---|---|
| 5,579,140 | A | | 11/1996 | Yamahara et al. |
| 5,594,569 | A | * | 1/1997 | Konuma et al. .............. 349/122 |
| 6,281,952 | B1 | * | 8/2001 | Okamoto et al. .............. 349/12 |
| 6,757,038 | B2 | * | 6/2004 | Itoh et al. .................... 349/113 |
| 6,885,423 | B2 | * | 4/2005 | Shuto et al. .................. 349/127 |
| 6,897,924 | B2 | * | 5/2005 | Tashiro et al. ................ 349/113 |
| 7,038,743 | B2 | * | 5/2006 | Komitov et al. ............... 349/88 |
| 7,119,861 | B2 | * | 10/2006 | Tsuchiya et al. ............ 349/108 |
| 2002/0054269 | A1 | | 5/2002 | Maeda et al. |
| 2002/0080320 | A1 | | 6/2002 | Suzuki et al. |
| 2003/0048401 | A1 | | 3/2003 | Hanaoka et al. |
| 2003/0086044 | A1 | | 5/2003 | Inoue et al. |
| 2007/0076153 | A1 | * | 4/2007 | Kashima ..................... 349/117 |

FOREIGN PATENT DOCUMENTS

| | | |
|---|---|---|
| JP | 5-232465 | 9/1993 |
| JP | A 7-84244 | 3/1995 |
| JP | 7-333598 | 12/1995 |

(Continued)

*Primary Examiner*—Dung T. Nguyen
(74) *Attorney, Agent, or Firm*—Kratz, Quintos & Hanson, LLP

(57) ABSTRACT

The invention relates to a transflective liquid crystal display and a method of manufacturing the same and provides a transflective liquid crystal display which can achieve high display characteristics in both of reflective and transmissive modes and a method of manufacturing the same. The display has a pair of substrates provided opposite to each other, a liquid crystal sealed between the pair of substrates, a plurality of pixel regions each having a reflective area which reflects light from the side of one of the substrates and a transmissive area which transmits light from the side of the other of the substrates toward the one of the substrates, and an ultraviolet-hardened material which is a product of polymerization of a polymeric component mixed in the liquid crystal with ultraviolet light and which is formed at a substrate interface in the reflective area to control the alignment of the liquid crystal in the reflective area.

33 Claims, 22 Drawing Sheets

FOREIGN PATENT DOCUMENTS

| | | |
|---|---|---|
| JP | 8-338993 | 12/1996 |
| JP | 11-242226 | 9/1999 |
| JP | 11-281972 | 10/1999 |
| JP | 2000-029012 | 1/2000 |
| JP | 2001-221995 | 8/2001 |
| JP | 2002-287158 | 10/2002 |
| JP | 2002-296585 | 10/2002 |
| JP | 2002-357830 | 12/2002 |
| JP | A 2003-177418 | 6/2003 |
| KR | 1998-15423 | 5/1998 |
| KR | 2003-0058092 | 7/2003 |

* cited by examiner

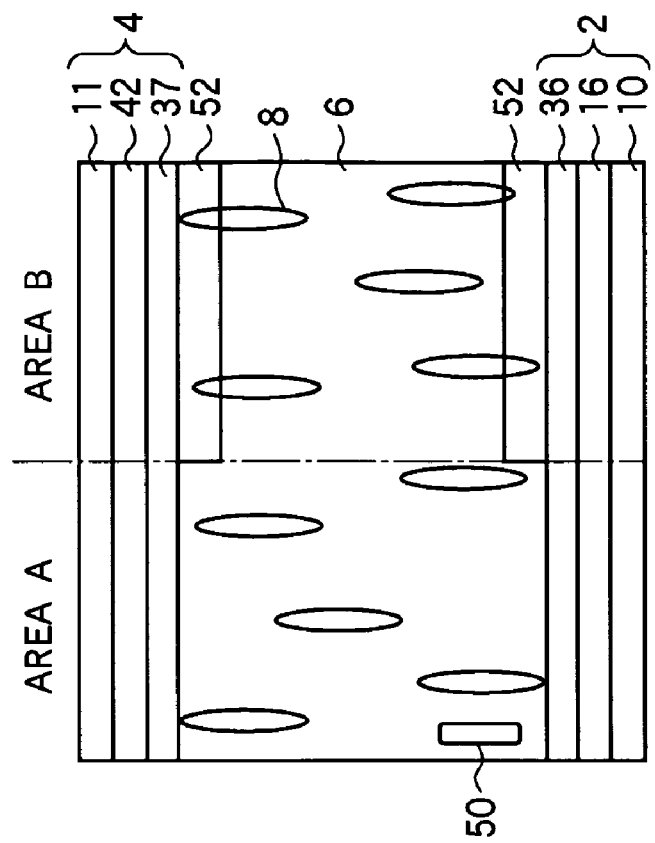
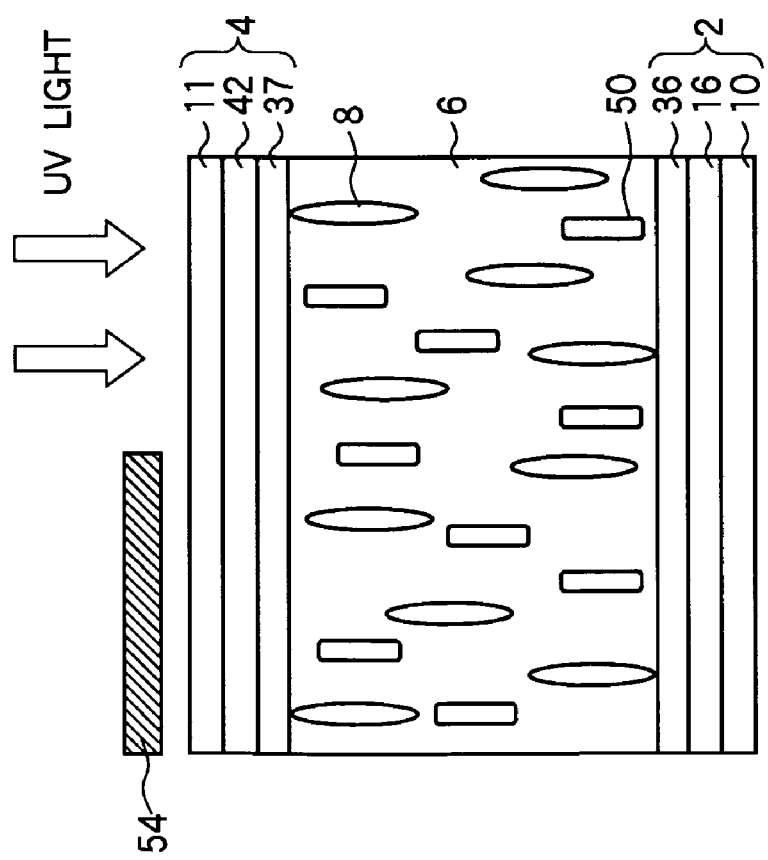

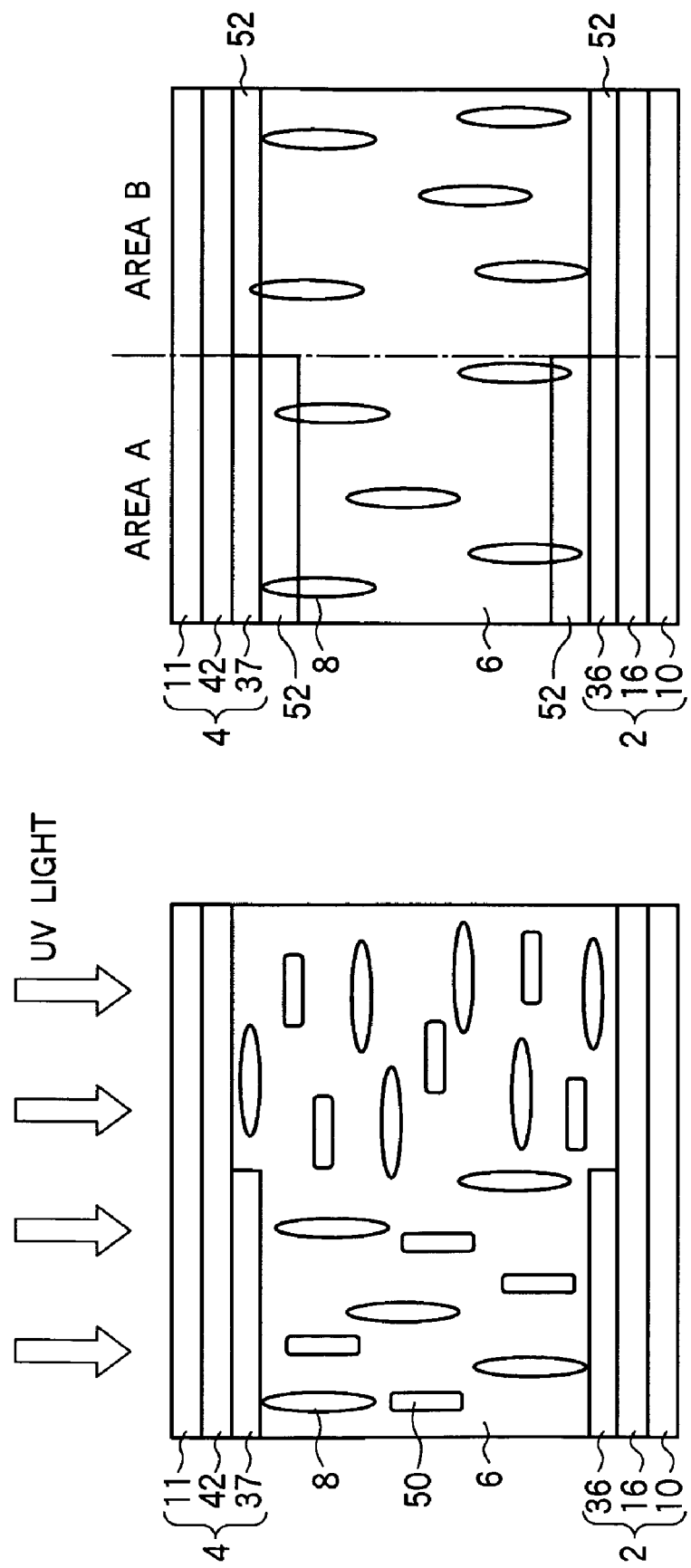

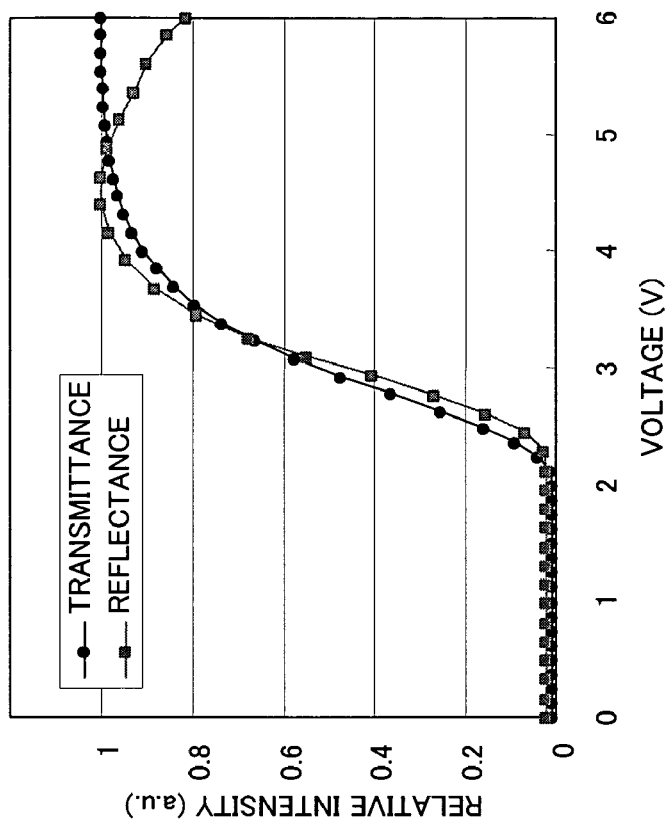
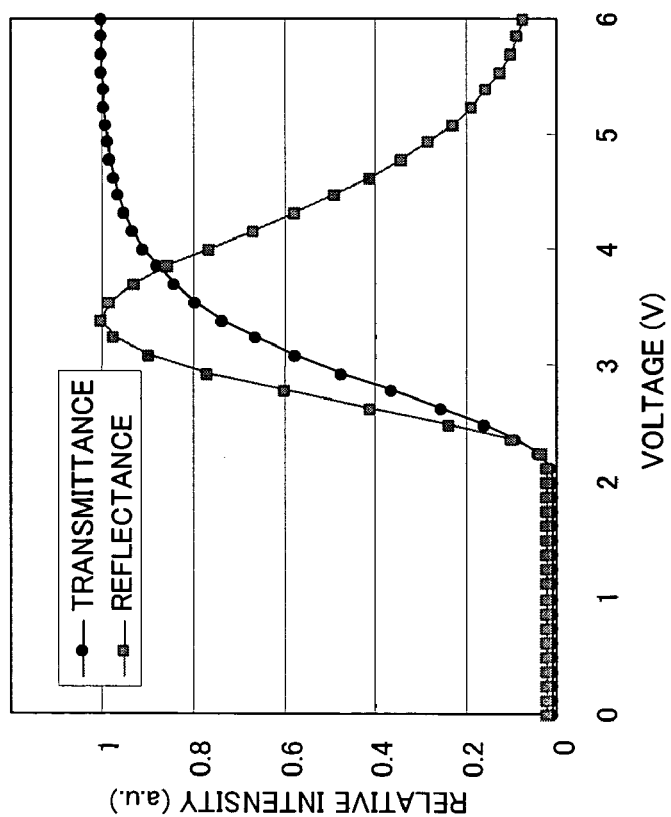
FIG.6A
FIG.6B

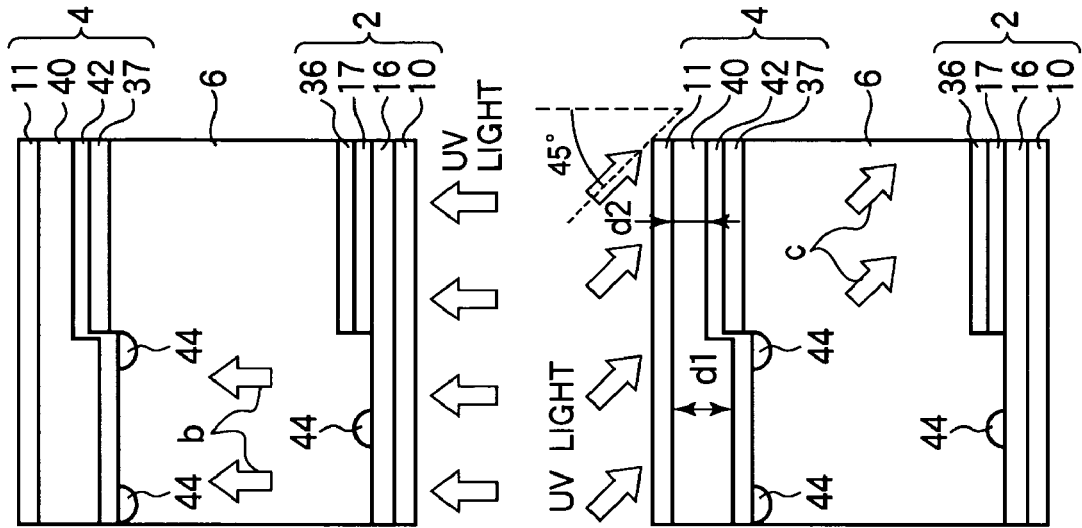
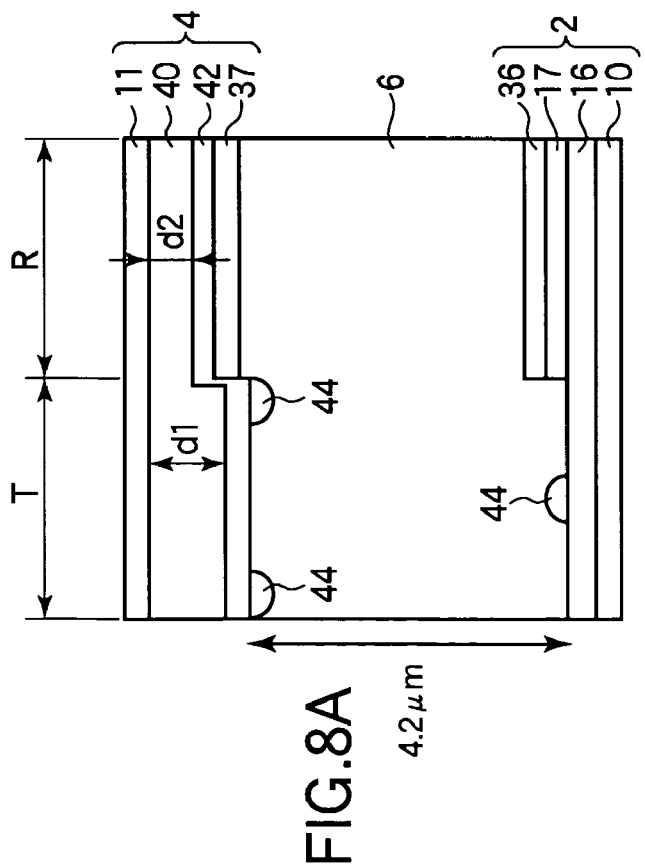
FIG.8A
FIG.8B
FIG.8C

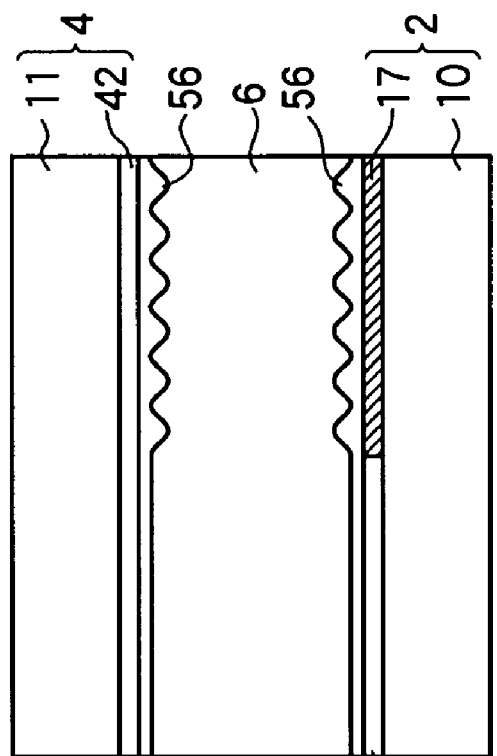
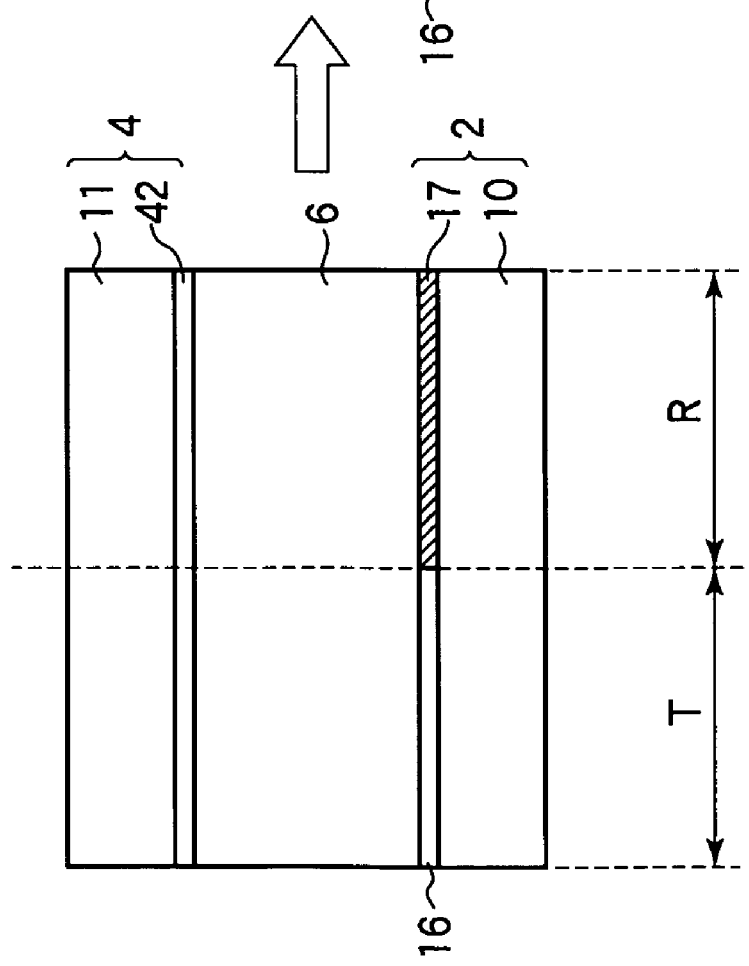

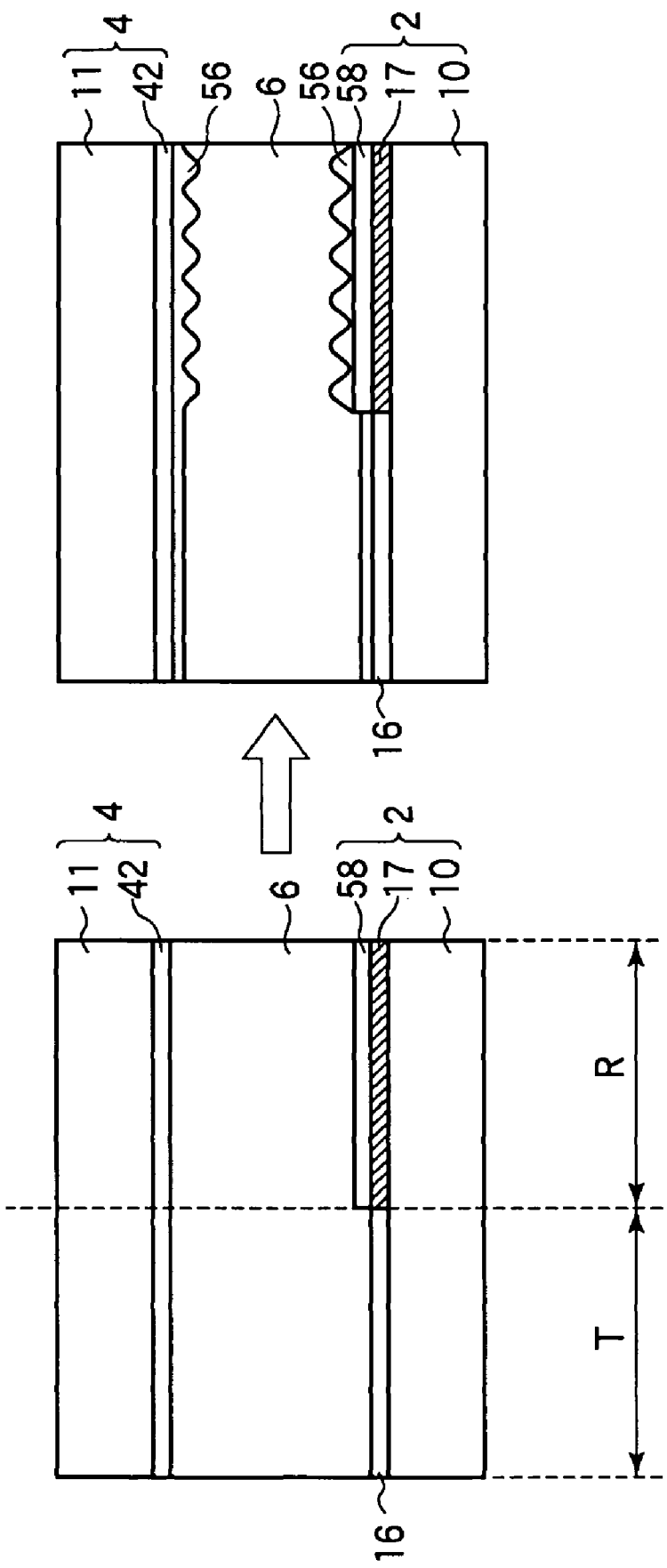

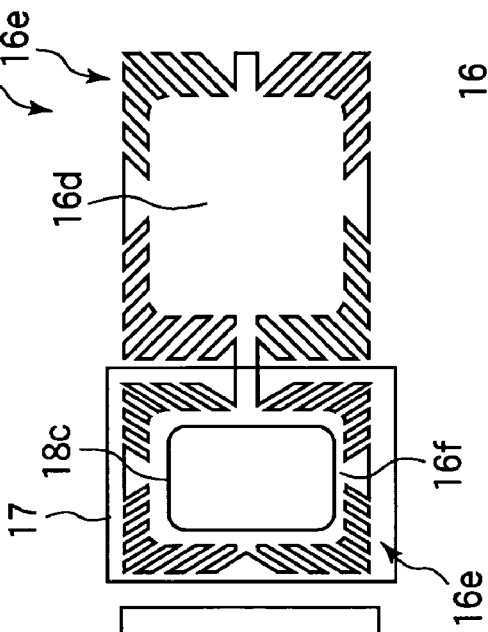
FIG.18A
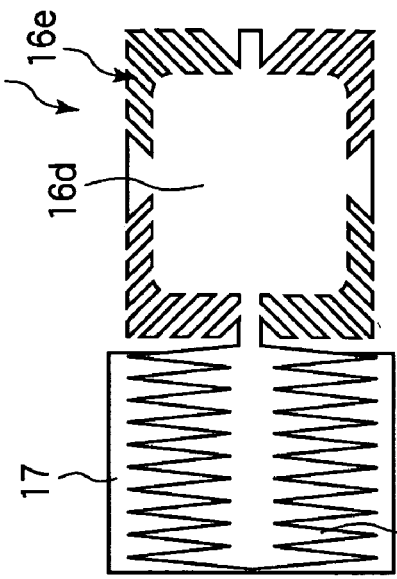
FIG.18B
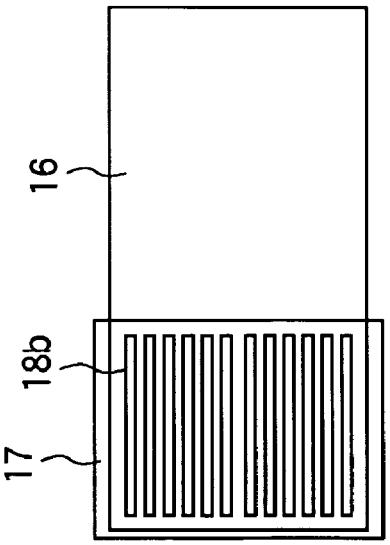
FIG.18C
FIG.18D
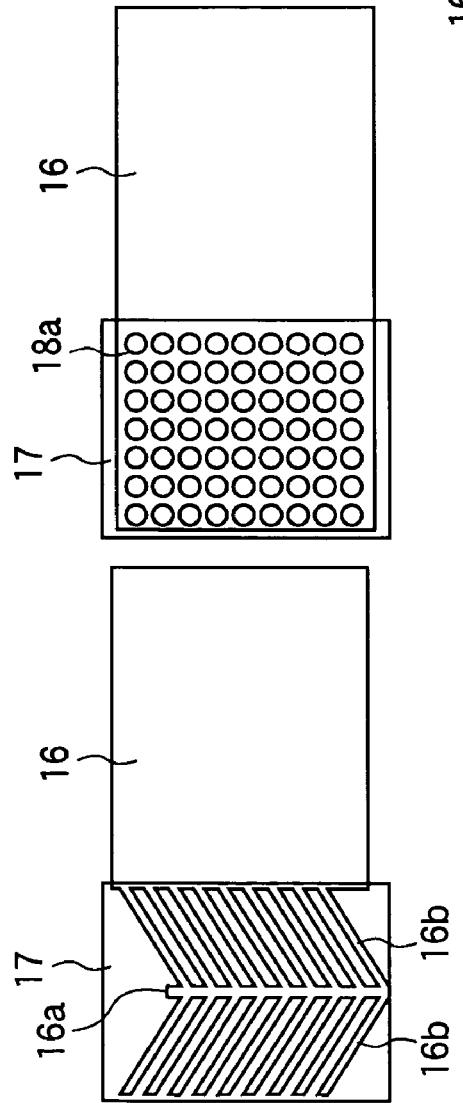
FIG.18E
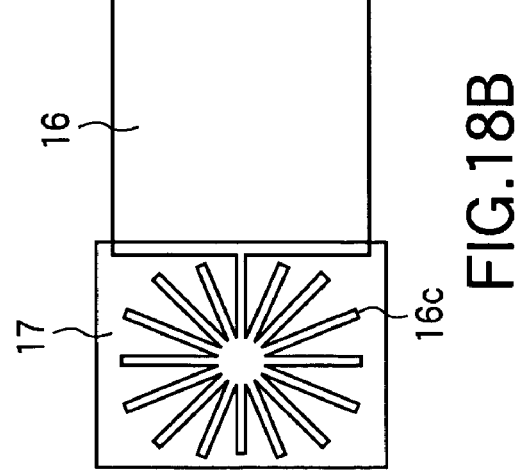
FIG.18F

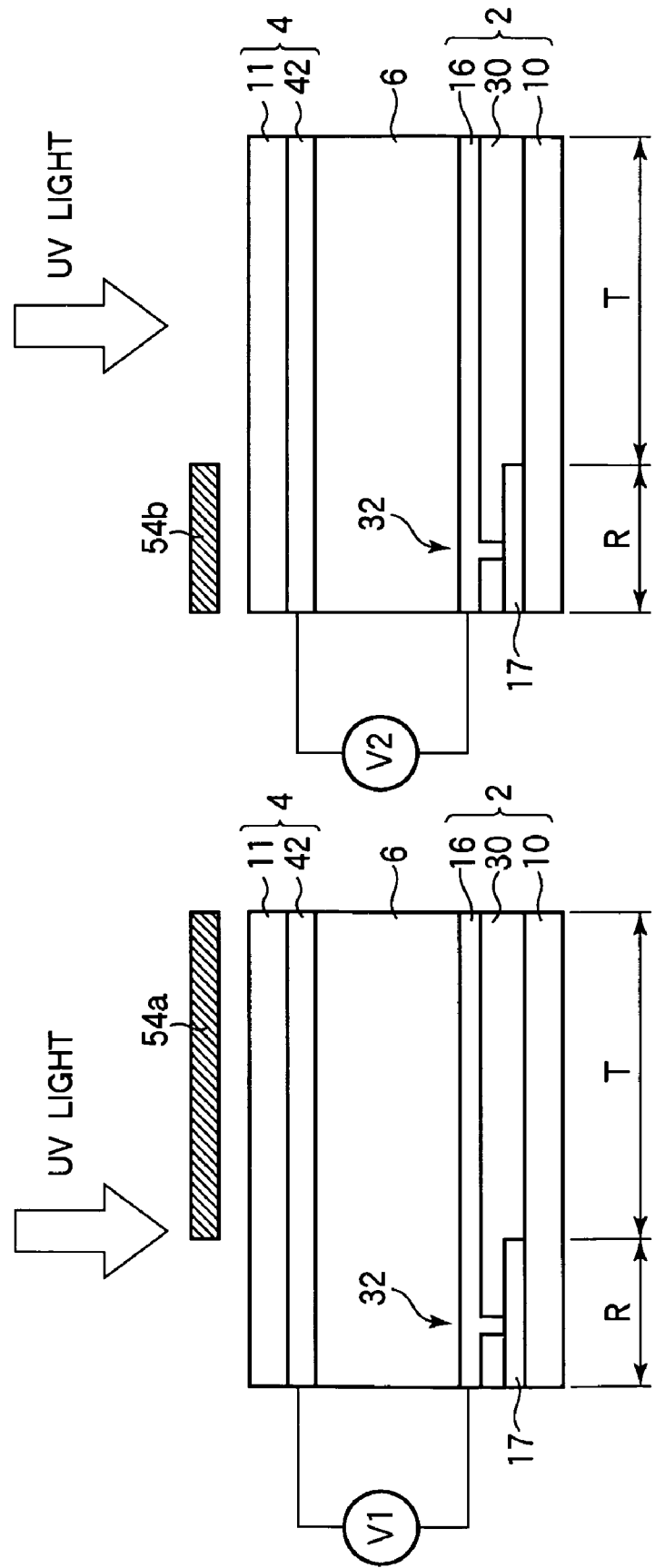

LIQUID CRYSTAL DISPLAY AND METHOD OF MANUFACTURING THE SAME

BACKGROUND OF THE INVENTION

1. Field of the Invention

The present invention relates to a liquid crystal display and a method of manufacturing the same and, more particularly, to a transflective liquid crystal display capable of display in both reflective and transmissive modes and a method of manufacturing the same.

2. Description of the Related Art

Among active matrix type liquid crystal displays, attention is recently paid to reflective liquid crystal displays which can be provided with a light weight and a small thickness and which consume low power. Reflective liquid crystal displays that are currently in practical use are one-polarizer type displays utilizing a TN (Twisted Nematic) mode liquid crystal (see Patent Documents 1 and 2 for example). However, a one-polarizer type reflective liquid crystal display has a problem in that it undergoes a significant reduction in visibility in an environment of low brightness because the visibility of the display significantly depends on the brightness of the surroundings.

Meanwhile, a transmissive liquid crystal display is characterized in that it exhibits high contrast and visibility even in a dark environment although it consumes high power because of the use a backlight unit as a light source. However, a transmissive liquid crystal display has a problem in that it undergoes a significant reduction in visibility and therefore becomes poorer in display quality than a reflective liquid crystal display in a bright environment.

Techniques for mitigating the above-described problems of the reflective and transmissive liquid crystal displays include front-light type liquid crystal displays which are combinations of a reflective liquid crystal display and a front-light unit and transflective liquid crystal displays utilizing transflective films as pixel electrodes (see Patent Document 3 for example). However, a front-light type liquid crystal display has a problem in that it has a contrast ratio lower than that of a transmissive liquid crystal display in a dark environment and in that it displays an object darker than a normal reflective liquid crystal display does in a bright environment due to absorption of light at a light guide plate of the front-light unit.

On the contrary, Metal thin films such as aluminum (Al) thin films having a thickness of about 30 nm are normally used as transflective films of a transflective liquid crystal display as described above. A metal thin film has a problem in that it reduces utilization of light because it has a great light absorption coefficient. Further, since it is very difficult to form a metal thin film having a great area and a uniform thickness, a problem arises in that a variation of the thickness of a transflective film can result in a great in-plane variation of the transmittance of the film.

Techniques for solving the above-described problems include transflective liquid crystal displays which have a reflective area formed with a reflective electrode reflecting light and a transmissive area formed with a transparent electrode transmitting light at each pixel (see Patent Document 4 for example). Such a transflective liquid crystal display can display an object with a relatively high contrast ratio in both of the reflective and transmissive modes, and it has no in-plane variation of transmittance.

In a transflective liquid crystal display, however, light passes through a liquid crystal layer only once during display in the transmissive mode, whereas light passes through the liquid crystal layer twice during display in the reflective mode. In the configuration disclosed in Patent Document 4, since a transmissive area and a reflective area have substantially the same cell thickness (the thickness of the liquid crystal layer) and liquid crystal alignment, substantial retardation in the reflective area is approximately twice retardation in the transmissive area when consideration is paid to the fact that light passes through the liquid crystal layer twice in the reflective area. When the cell thickness is set such that display is preferably performed in either of the reflective and transmissive modes, the brightness and contrast ratio are reduced in the other mode. A problem therefore arises in that it is not possible to perform preferable display in both of the reflective and transmissive modes.

Techniques for solving the above-described problem include dual cell gap type transflective liquid crystal displays in which a reflective area and a transmissive area have different cell thicknesses (see Patent Document 5 for example). FIG. 26 shows a sectional configuration of such a transflective liquid crystal display. FIG. 26 shows a transmissive area T of a pixel region on the left side thereof and a reflective area R on the right side thereof. As shown in FIG. 26, the transflective liquid crystal display has a thin film transistor (TFT) substrate 102 and an opposite substrate 104 which are provided opposite to each other and a liquid crystal 106 sealed between the substrates 102 and 104. A pair of polarizers 186 and 187 is provided so as to sandwich the substrates 102 and 104. The TFT substrate 102 has a transparent pixel electrode 116 formed on a glass substrate 110. A leveling film 134 having a thickness of about 2 μm is formed on the pixel electrode 116 in the reflective area R to make a cell thickness dR in the reflective area R smaller than a cell thickness dT in the transmissive area T. A reflective electrode 117 is formed on the leveling film 134. The opposite substrate 104 has a transparent common electrode 142 formed on a glass substrate 111.

Since a voltage applied to the liquid crystal 106 is substantially constant in the same pixel, liquid crystal molecules 108T in the transmissive area T and liquid crystal molecules 108R in the reflective area R are tilted at substantially the same tilting angle. Therefore, refractive index anisotropy ΔnT of the transmissive area T and refractive index anisotropy ΔnR of the reflective area R are substantially equal to each other (ΔnT≈ΔnR). The cell thickness dR in the reflective area R is smaller than the cell thickness dT in the transmissive area T (dT>dR), and the cell thickness dR is about one-half of the cell thickness dT (dT≈2·dR). Thus, the substantial retardation in the reflective area R and the retardation in the transmissive area T are substantially equal to each other, and sufficient brightness and contrast ratio can therefore be achieved in both of the reflective and transmissive modes.

However, since there is a need for forming the leveling film 134 in the reflective area R, the transflective liquid crystal display has a problem in that it involves complicated manufacturing processes which results in an increase in the manufacturing cost. In the transflective liquid crystal display, since the reflective area R and the transmissive area T have different cell thicknesses, the speed of response of the liquid crystal 106 varies accordingly. Further, since the thickness of the leveling film 134 is about one-half of the cell thickness in the transmissive area T, a relatively large step is formed at a boundary between the reflective area R and the transmissive area T. Such a step can cause a defect in the alignment of the liquid crystal 106 and can accumulate a liquid applied to form an alignment film.

Let us assume that spherical spacers are used to maintain the cell thicknesses of the above-described transflective liquid crystal display. Then, if the diameter of the spherical spacers is adjusted to the cell thickness of either of the reflective area R and the transmissive area T, the desired cell thickness can not be achieved in the other area when the spherical spacers are disposed in the other area. As thus described, a dual gap type transflective liquid crystal display has a problem in that it is difficult to control cell thicknesses of the same.

Another problem arises in that a difference between light paths in the reflective area R and the transmissive area T results in a difference in color purity between the reflective and transmissive modes. Specifically, light passes through a CF layer once in the transmissive area T, whereas light passes through a CF layer twice and therefore has a relatively low transmittance in the reflective area R. When the color purity of the CF layer is adjusted to perform display with high brightness in the reflective mode, the color purity of display in the transmissive mode becomes quite low to render the display too light. When the color purity of the CF layer is adjusted to perform preferable display in the transmissive mode, transmittance becomes low during display in the reflective mode to render the display very dark. Patent Document 6 discloses a technique for providing a reflective area R and a transmissive area T with different degrees of color purity to mitigate the problem. According to the technique, a CF layer is provided throughout the transmissive area T, whereas the CF layer is formed in parts of the reflective area R to correct the color purity of the area. According to this technique, however, there is a need for a new processing step for leveling steps which are produced by the partially formed CF layer. This necessitates a greater number of manufacturing processes than a step for fabricating an opposite substrate 104 having an ordinary CF layer and consequently results in an increase in the manufacturing cost of a liquid crystal display.

Patent Document 1: Japanese Patent Laid-Open No. JP-A-5-232465
Patent Document 2: Japanese Patent Laid-Open No. JP-A-8-338993
Patent Document 3: Japanese Patent Laid-Open No. JP-A-7-333598
Patent Document 4: Japanese Patent Laid-Open No. JP-A-11-281972
Patent Document 5: Japanese Patent No. 3380482
Patent Document 6: Japanese Patent No. 3410664
Patent Document 7: Japanese Patent Laid-Open No. JP-A-2002-296585

SUMMARY OF THE INVENTION

It is an object of the invention to provide a transflective liquid crystal display which can achieve high display characteristics in both of the reflective and transmissive modes and a method of manufacturing the same.

The above-described object is achieved by a liquid crystal display characterized in that it has a pair of substrates provided opposite to each other, a liquid crystal sealed between the pair of substrates, a plurality of pixel regions each having a reflective area which reflects light from the side of one of the pair of substrates and a transmissive area which transmits light from the side of the other of the pair of substrates toward the one of the pair of substrates, and an ultraviolet-hardened material which is a product of polymerization of a polymeric component mixed in the liquid crystal with ultraviolet light and which is formed in a part of the neighborhood of an interface between the liquid crystal and the pair of substrates to control the alignment of a part of the liquid crystal in the pixel region.

The invention makes it possible to provide a transflective liquid crystal display which can achieve high display characteristics in both of the reflective and transmissive modes.

BRIEF DESCRIPTION OF THE DRAWINGS

FIGS. 2A and 2B are diagrams showing a first basic configuration of the liquid crystal display in the first mode for carrying out the invention;

FIGS. 4A and 4B are diagrams showing a second basic configuration of the liquid crystal display in the first mode for carrying out the invention;

FIGS. 6A and 6B are graphs showing transmittance characteristics and reflectance characteristics relative to applied voltages;

FIGS. 8A to 8C are diagrams showing a method of manufacturing a liquid crystal display according to Embodiment 1-3 in the first mode for carrying out the invention;

FIGS. 14A and 14B are diagrams showing a configuration of a liquid crystal display according to Embodiment 2-2 in the second mode for carrying out the invention;

FIGS. 15A and 15B are diagrams showing a configuration of a liquid crystal display according to Embodiment 2-3 in the second mode for carrying out the invention;

FIGS. 18A to 18F are diagrams showing examples of shapes of a reflective electrode and a transparent electrode;

FIGS. 25A and 25B are diagrams showing a method for manufacturing a liquid crystal display according to Embodiment 3-4 in the third mode for carrying the invention.

DESCRIPTION OF THE PREFERRED EMBODIMENTS

[First Mode for Carrying Out the Invention]

Figure 1:
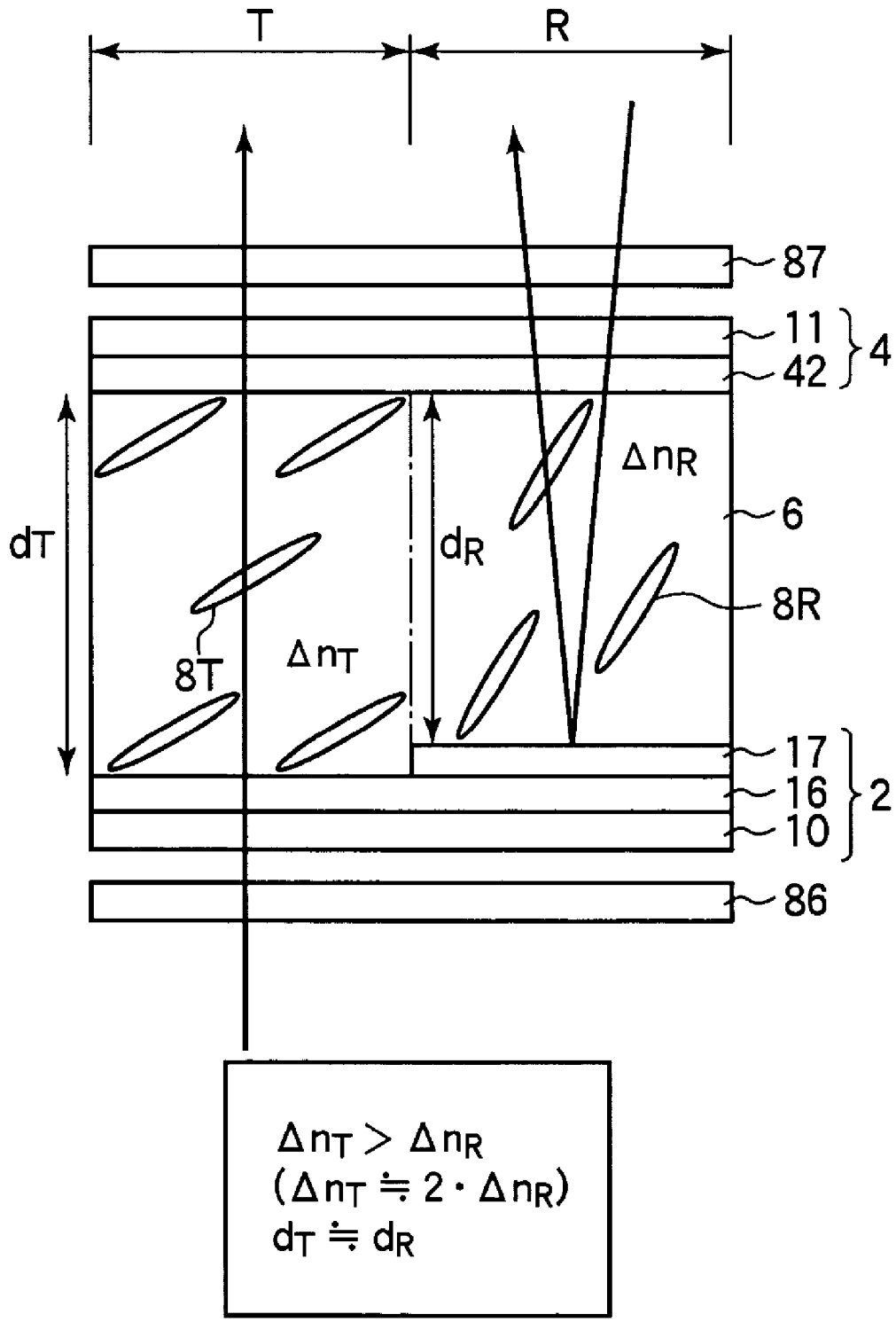
FIG. 1 is a diagram showing a principle of a liquid crystal display in a first mode for carrying out the invention.

A liquid crystal display and a method of manufacturing the same in a first mode for carrying out the invention will now be described with reference to FIGS. 1 to 9. In the present mode for carrying out the invention, instead of providing a reflective area R and a transmissive area T with different cell thicknesses, a modulating effect exerted on light by a liquid crystal in the reflective area R is made different from a modulating effect exerted on light by the liquid crystal in the transmissive area T. FIG. 1 is a sectional view of a pixel showing a principle of a transflective liquid crystal display in the present mode for carrying out the invention. FIG. 1 shows a transmissive area T of the pixel region on the left side thereof and a reflective area R on the right side thereof. As shown in FIG. 1, the transflective liquid crystal display has a TFT substrate 2 and an opposite substrate 4 which are provided opposite to each other and a liquid crystal 6 sealed between the substrates 102 and 104. For example, the liquid crystal 6 has negative dielectric constant anisotropy, and it is aligned substantially perpendicularly to the surfaces of the substrates when no voltage is applied. A pair of polarizers 86 and 87 is provided so as to sandwich the TFT substrate 2 and the opposite substrate 4. Both of the polarizers 86 and 87 may be linear polarizers or circular polarizers (combinations of a linear polarizer and a ¼-wave plate). Alternatively, a combination of a linear polarizer and a circular polarizer may be used (i.e., one of the polarizers may be a linear polarizer and the other may be a circular polarizer). The TFT substrate 2 has a transparent electrode 16 formed at each pixel region on a glass substrate 10. A reflective electrode 17 is formed on the transparent electrode 16 in the reflective area R. The opposite substrate 4 has a transparent common electrode 42 which is formed substantially throughout a glass substrate 11. As a result, as indicated by the arrows in the figure, light from the side of TFT substrate 2 is transmitted in the transmissive area T, and light from the side of the opposite substrate 4 is reflected in the reflective area R.

In the present mode for carrying out the invention, the transmissive area T and the reflective area R are different from each other in vertical alignment ability of the alignment layer, and liquid crystal molecules 8T in the transmissive area T are tilted by a greater amount than liquid crystal molecules 8R in the reflective area R when a voltage is applied. As a result, refractive index anisotropy $\Delta nT$ of the transmissive area T becomes larger than refractive index anisotropy $\Delta nR$ of the reflective area R ($\Delta nT > \Delta nR$). For example, the refractive index anisotropy $\Delta nR$ is about one-half of the refractive index anisotropy $\Delta nT$ ($\Delta nT \approx 2 \cdot \Delta nR$). In the present mode for carrying out the invention, the cell thickness dT in the transmissive area T and the cell thickness dR in the reflective area R are substantially equal to each other ($dT \approx dR$), or the cell thickness dT is smaller than the cell thickness dR ($dT < dR$).

In the present mode for carrying out the invention, substantial retardation in the reflective area R substantially equals retardation in the transmissive area T, which allows sufficient brightness and contrast ratio to be achieved in both of the reflective and transmissive modes.

A description will now be made on a first basic configuration of the liquid crystal display in the present mode for carrying out the invention for realizing the above-described principle. In the basic configuration, an ultraviolet-hardened material is formed in parts of the neighborhood of an interface between the liquid crystal 6 and the TFT substrate 2 and the neighborhood of an interface between the liquid crystal 6 and the opposite substrate 4 (hereinafter simply referred to as "substrate interfaces") in order to make the transmissive area T and the reflective area R different from each other in amount of shifts of the liquid crystal molecules. For example, the ultraviolet-hardened material is formed on substrate interfaces in either of the transmissive area T and the reflective area R. The ultraviolet-cure material works as an alignment control layer for controlling the alignment and the amount of shifts of the liquid crystal molecules, for example, in combination with an alignment film. FIGS. 2A and 2B show a method of forming the ultraviolet-hardened material in parts of substrate interfaces. Although the description refers to a vertical alignment mode liquid crystal display having vertical alignment films formed therein, the invention is not limited to the same and can be similarly applied to other modes of alignment. As shown in FIG. 2A, an alignment film (vertical alignment film) 36 is formed, through coating, on an entire surface of the TFT substrate 2, and an alignment film 37 is formed, through coating, on an entire surface of the opposite substrate 4. Next, the TFT substrate 2 and the opposite substrate 4 are combined to seal the liquid crystal 6 mixed with a monomer 50 that is a photo-polymeric component between the substrates 2 and 4. Next, the liquid crystal 6 is irradiated with ultraviolet (UV) light through a shielding mask 54 which is formed with a shielding pattern in a part thereof. As a result, as shown in FIG. 2B, the monomer 50 is polymerized in a region B which has been irradiated with UV light, and an ultraviolet-hardened material 52 is formed at substrate interfaces. At this time, a large part of the monomer 50 in a shielded region A has been absorbed in the ultraviolet-hardened material 52. The monomer 50 mixed in the liquid crystal 6 is not limited to one type of monomer, and it may be a mixture of two or more types of monomers. However, it is desirable that one of the monomers has two or more optically functional groups at least. Since the ultraviolet-hardened material 52 has the function of changing the alignment ability of the liquid crystal 6, switching characteristics of the liquid crystal 6 in response to an applied voltage can be varied between the region B where the ultraviolet-hardened material 52 is formed and the region A where the ultraviolet-hardened material 52 is not formed. That is, the above-described principle can be realized by forming the ultraviolet-hardened material 52 in the reflective area R of the pixel region.

Figure 3B:
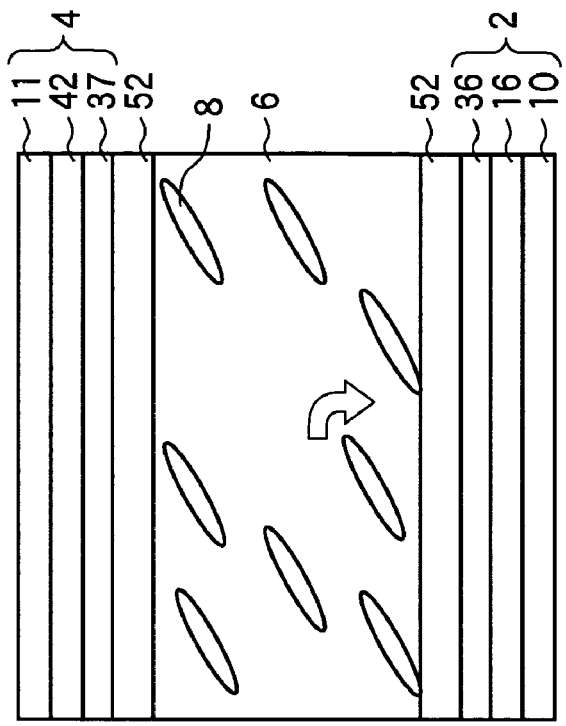
FIGS. 3A and 3B are diagrams showing an example of a method of forming an ultraviolet-hardened material.
Figure 3A:
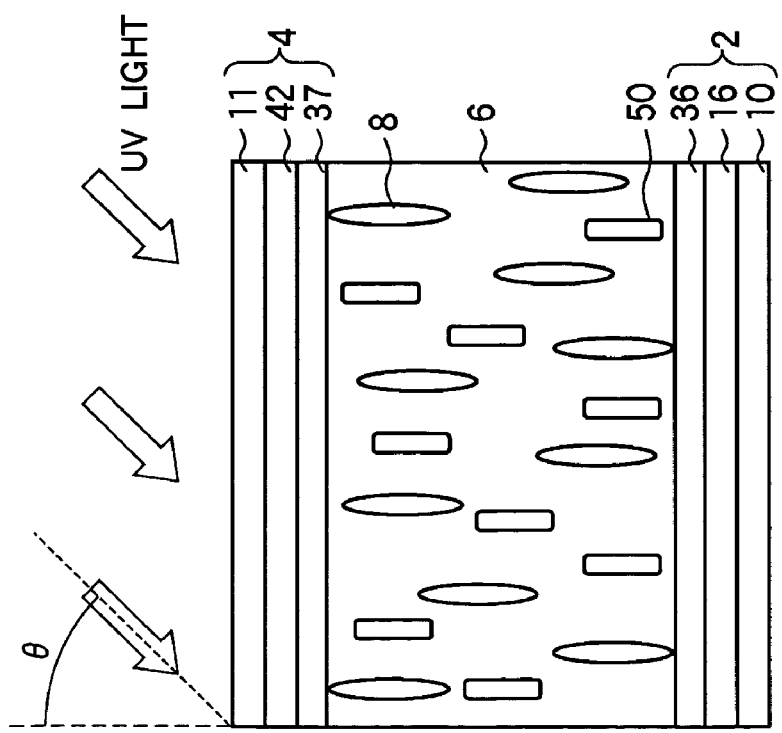

FIGS. 3A and 3B show an example of another method of forming the ultraviolet-hardened material 52 at substrate interfaces. As shown in FIG. 3A, UV light incident on a substrate surface in an oblique direction (at an incident angle θ) to form an ultraviolet-hardened material 52 is radiated to the liquid crystal 6. The ultraviolet-hardened material 52 formed by the incident light in an oblique direction aligns liquid crystal molecules in a direction that is slightly inclined from the direction perpendicular to the substrate surface toward the oblique direction. Thus, as shown in FIG. 3B, the tilting direction of liquid crystal molecules 8 at the time of application of a voltage is defined (as indicated by the thick arrow in the figure), and the switching characteristics of the liquid crystal 6 in response to the applied voltage are different from those in a case wherein UV light perpendicularly impinges upon the substrate surface as seen in the region B in FIG. 2B. The ultraviolet-hardened material 52 may be formed by irradiating it with UV light at an incident angle θ that varies depending on areas using a predetermined shielding mask to vary the switching characteristics of the liquid crystal 6 depending on areas.

A second basic configuration of the liquid crystal display in the present mode for carrying out the invention will now be described. FIGS. 4A and 4B show a method of forming an ultraviolet-hardened material. The above-described first basic configuration is an example in which the alignment films 36 and 37 are formed, through coating, on the entire surfaces of the respective substrates and in which the ultraviolet-hardened material 52 is formed on parts of the alignment films 36 and 37. On the contrary, in the present basic configuration, alignment films (vertical alignment films) 36 and 37 are partially formed through coating as shown in FIG. 4A, and an ultraviolet-hardened material 52 is formed throughout substrate interfaces as shown in FIG. 4B. Liquid crystal molecules 8 can be vertically aligned by forming the ultraviolet-hardened material 52 even in an area B where the alignment films 36 and 37 are not formed through coating. The strength of anchoring at a polar angle becomes very low in the area B where the alignment films 36 and 37 are not formed because the liquid crystal molecules 8 are bound only by the ultraviolet-hardened material 52 in the area. As a result, the liquid crystal molecules 8 become easy to switch. In an area A where the alignment films 36 and 37 are formed, the strength of anchoring at a polar angle becomes very high because the liquid crystal molecules 8 are bound not only by the alignment films 36 and 37 but also by the ultraviolet-hardened material 52. As a result, the liquid crystal molecules 8 become difficult to switch. This basic configuration makes it possible to vary the switching characteristics of a liquid crystal 6 depending on areas as thus described.

The photo-polymeric monomer 50 for forming the ultraviolet-hardened material 52 must satisfy two requirements. Specifically, it must sufficiently react to such light that the liquid crystal 6 is not damaged, and the performance of the ultraviolet-hardened material 52 in regulating the alignment of the liquid crystal 6 must not undergo any change as time passes. When these characteristics are insufficient, defects such as image sticking of a panel can occur. The monomer 50 must be a compound including a ring system in order to satisfy the above-described requirements, and it has been found desirable that the monomer 50 has a benzene ring as a ring system. In addition, it is desirable that there is no spacer (—$CH_2$—) between the ring system and the photoreactive group.

The liquid crystal display and the method of manufacturing the same in the present mode for carrying out the invention will now be described with reference to specific embodiments of the same.

Embodiment 1-1

Figure 5:
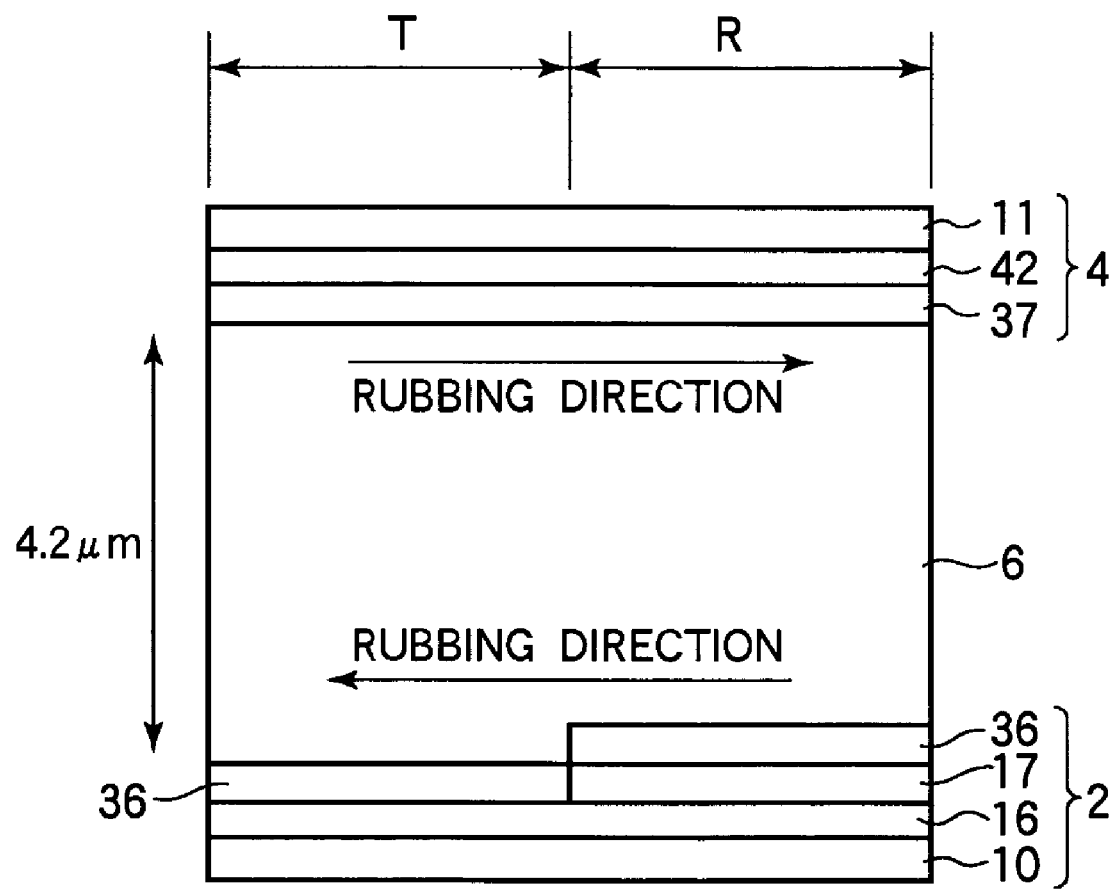
FIG. 5 is a diagram showing a configuration of a liquid crystal display as an example comparative to Embodiment 1-1 in the first mode for carrying out the invention.

A liquid crystal display according to Embodiment 1-1 and a liquid crystal display as an example comparative to the same were fabricated. First, a liquid crystal display as a comparative example shown in FIG. 5 was fabricated as follows. As shown in FIG. 5, an aluminum (Al) film was formed using sputtering on an entire surface of a transparent electrode 16 and was patterned to form a reflective electrode 17 in the area shown on the right half of the figure. Next, alignment films 36 and 37 were formed, through coating, on entire surfaces of a TFT substrate 2 and an opposite substrate 4, respectively using a polyamic acid material manufactured by JSR Corp. The substrates 2 and 4 were rubbed in predetermined respective rubbing directions to achieve anti-parallel rubbing, and the substrates 2 and 4 were combined to fabricate an open cell. A negative nematic liquid crystal manufactured by Merck KGaA was injected in the open cell. The cell thickness was set at 4.2 μm.

Next, the liquid crystal display of the present embodiment was fabricated as follows. A liquid crystal added with 1.5% photo-polymeric bifunctional monomer by weight was injected in a vacant cell similar to the above-described open cell. Thereafter, a reflective area R was irradiated with non-polarized UV light with a transmissive area T shielded from light with a shielding mask. The U light had irradiation intensity of 5 $mW/cm^2$ and irradiation energy of 9000 $mJ/cm^2$. Thus, an ultraviolet-hardened material 52 was formed at substrate interfaces in the reflective area R.

FIGS. 6A and 6B are graphs showing transmittance characteristics and reflectance characteristics relative to applied voltages. FIG. 6A shows the characteristics of the liquid crystal display as a comparative example, and FIG. 6B shows the characteristics of the liquid crystal display of the present embodiment. The abscissa axes of the FIGS. 6A and 6B represent applied voltages (V). The ordinate axes represent relative magnitudes (a.u.) of transmittance or reflectance, and the maximum values of transmittance and reflectance are set at 1. The black dots "●" in the graphs represent transmittance, and the black squares "■" represent reflectance. As shown in FIG. 6A, the transmittance of the liquid crystal display as a comparative example monotonously increases as the applied voltage increases within the range from 2 V to 5V, whereas the reflectance of the same reaches a peak at an applied voltage of about 3.3 V and decreases as the voltage increases after the peak. Therefore, at an applied voltage of 5 V, the transmittance substantially reaches the maximum value, whereas the reflectance is about ⅕ of the maximum value. On the contrary, as shown in FIG. 6B, the reflectance characteristics of the liquid crystal display of the present embodiment could be made fairly similar to the transmittance characteristics.

Embodiment 1-2

A liquid crystal display according to Embodiment 1-2 and a liquid crystal display as an example comparative to the same were fabricated. In the present embodiment and the comparative example, a color filter (CF) layer 40 was formed on a glass substrate 11 forming a part of an opposite substrate 4. Light passes through the CF layer 40 only once during display in the transmissive mode, whereas light passes through the CF layer 40 twice during display in the reflective mode. Therefore, the CF layer 40 is formed with a thickness d1 in a transmissive area T and formed with a thickness d2 that is about one-half of the thickness d1 in a reflective area R (see FIG. 7). The substrates 2 and 4 were rubbed on an anti-parallel rubbing basis in a manner similar to that in Embodiment 1-1, and the substrates 2 and 4 were combined to fabricate an open cell. A negative nematic liquid crystal manufactured by Merck KGaA was injected in the open cell to fabricate the liquid crystal display as a comparative example. The cell thickness in the transmissive area T was set at 4.2 μm.

Figure 7:
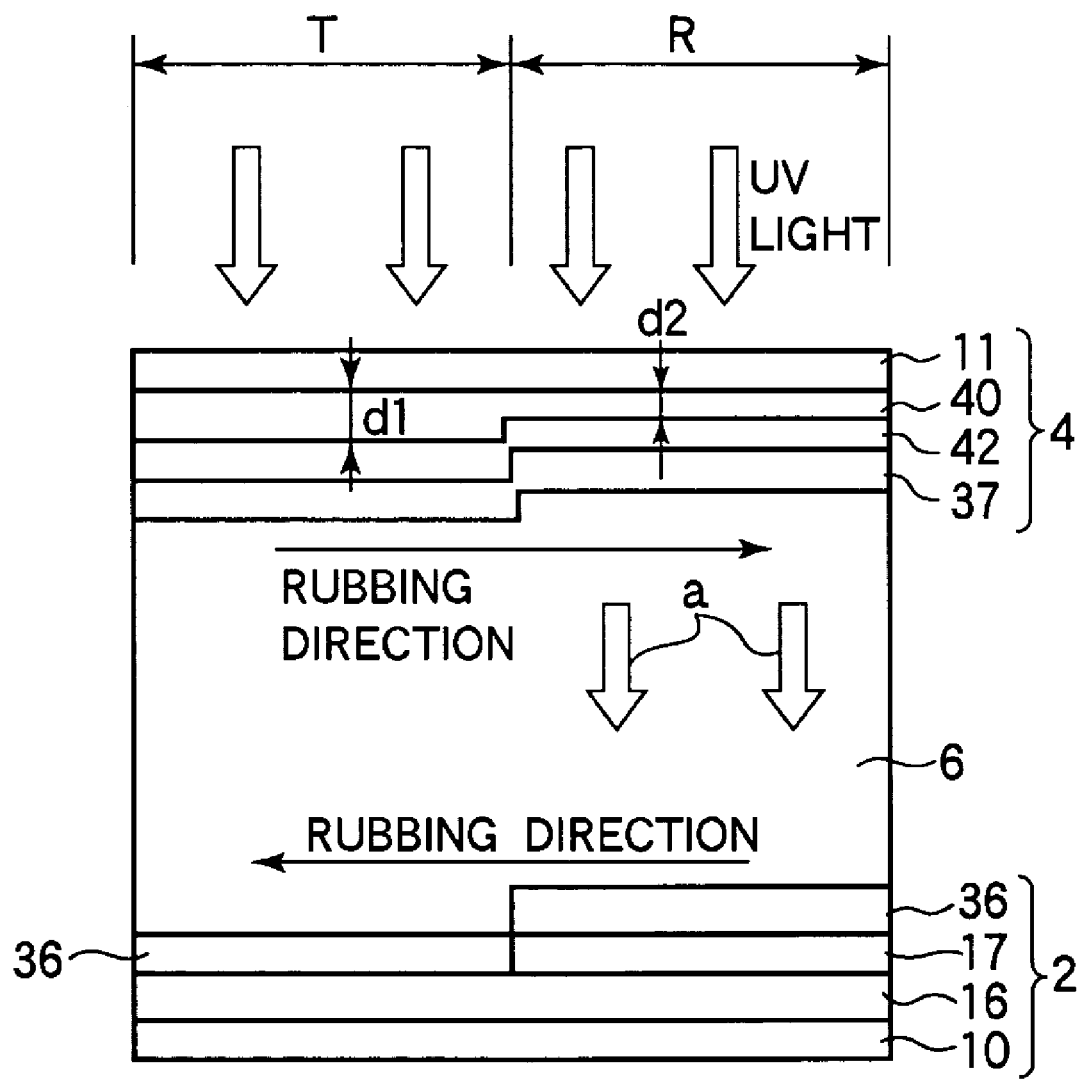
FIG. 7 is a diagram showing a step of irradiating a liquid crystal display according to Embodiment 1-2 in the first mode for carrying out the invention with UV light.

A liquid crystal added with 1.5% photo-polymeric bifunctional monomer by weight and a little photo initiator was injected in a vacant cell similar to the above-described open cell. Then, the entire cell was irradiated with non-polarized UV light from the side of the opposite substrate 4 without using a shielding mask. The UV light had irradiation intensity of 2 mW/cm$^2$ and irradiation energy of 9000 mJ/cm$^2$. FIG. 7 shows the step of irradiating with UV light. In the reflective area R, since the CF layer 40 has the relatively small thickness d2, the radiated UV light is transmitted by the CF layer 40 to enter the liquid crystal 6 (the arrows a in FIG. 7). In the transmissive area T, the CF layer 40 having the greater thickness d1 serves as a mask to substantially prevent the UV light from entering the liquid crystal 6. Therefore, an ultraviolet-hardened material was formed at substrate interfaces in the reflective area R, whereas no ultraviolet-hardened material was formed in the transmissive area T. The liquid crystal display of the present embodiment was fabricated through the above-described steps.

Transmittance characteristics and reflectance characteristics of the liquid crystal display as a comparative example were evaluated and found to be substantially similar to the characteristics of the comparative example for Embodiment 1-1 shown in FIG. 6A. However, the liquid crystal display of the present comparative example had a slightly greater difference between the transmittance and reflectance characteristics because the reflective area R had a greater cell thickness that is attributable to the smaller thickness d2 of the CF layer 40 in the reflective area R. Similarly to the liquid crystal display of Embodiment 1-1 shown in FIG. 6B, the liquid crystal display of the present embodiment could be provided with reflectance characteristics fairly similar to the transmittance characteristics. As described above, in the present embodiment, the ultraviolet-hardened material could be formed only in the reflective area R without using a shielding mask to change optical characteristics of the reflective area R without changing optical characteristics of the transmissive area T.

Embodiment 1-3

FIGS. 8A to 8C show a method of manufacturing a liquid crystal display according to Embodiment 1-3. In the present embodiment, as shown in FIG. 8A, linear protrusions 44 (banks) 44 were formed using a resist instead of applying and forming alignment films 36 and 37 in the transmissive area T. The reflective area R was not rubbed, although alignment films 36 and 37 were formed thereon through coating. The substrates 2 and 4 were combined with each other to leave a cell thickness of 4.2 μm in the transmissive area T, and an open cell was thus fabricated.

Next, a liquid crystal added with 0.8 wt % mixture of a photo-polymeric bifunctional monomer and a monofunctional monomer having an alkyl chain was injected in the open cell. Next, UV light incident upon the substrate surface substantially perpendicularly thereto was radiated from the side of the TFT substrate 2. The UV light had irradiation intensity of 2 mW/cm$^2$ and irradiation energy of 9000 mJ/cm$^2$. FIG. 8B shows the step of radiating the UV light from the side of the TFT substrate 2. As shown in FIG. 8B, since the UV light is radiated from the side of the TFT substrate 2, the UV light enters the liquid crystal 6 in the transmissive area T (the arrows b in the figure), whereas the UV light does not enter the liquid crystal 6 in the reflective area R because the light is blocked by a reflective electrode 17. Thus, an ultraviolet-hardened material is formed only in the transmissive area T.

Subsequently, the entire surface of the opposite substrate 4 is irradiated with non-polarized UV light. FIG. 8C shows the step of irradiating the cell with UV light from the side of the opposite substrate 4. As shown in FIG. 8C, the UV light is radiated as the angle of incident light is 45° to the substrate surface. The UV light had irradiation intensity of 8 mW/cm$^2$ and irradiation energy of 9000 mJ/cm$^2$. In the reflective area R, the radiated UV light is transmitted by the CF layer 40 to enter the liquid crystal 6 (the arrows c in the figure) because the CF layer 40 has a relatively small thickness d2 in the area. On the contrary, in the transmissive area T, the CF layer 40 has a greater thickness d1 and serves as a mask to substantially prevent the UV light from entering the liquid crystal 6. As a result, an ultraviolet-hardened material is formed only in the reflective area R. That is, an ultraviolet-hardened material is formed by the UV light substantially perpendicularly incident upon the substrate surface in the transmissive area T, and an ultraviolet-hardened material is formed by the UV light obliquely incident upon the substrate surface in the reflective area R. The liquid crystal display of the present embodiment was fabricated through the above-described steps.

An evaluation of the liquid crystal display thus fabricated revealed that liquid crystal molecules were vertically aligned and could be switched similarly to those in a normal MVA type liquid crystal display in spite of the fact that the alignment films 36 and 37 were not formed in the transmissive area T. In the reflective area R, in spite of the fact that no aligning process such as rubbing was performed, the direction of alignment of liquid crystal molecules could be regulated when a voltage was applied, and reflectance characteristics could be made fairly similar to transmittance characteristics.

Embodiment 1-4

Figure 9:
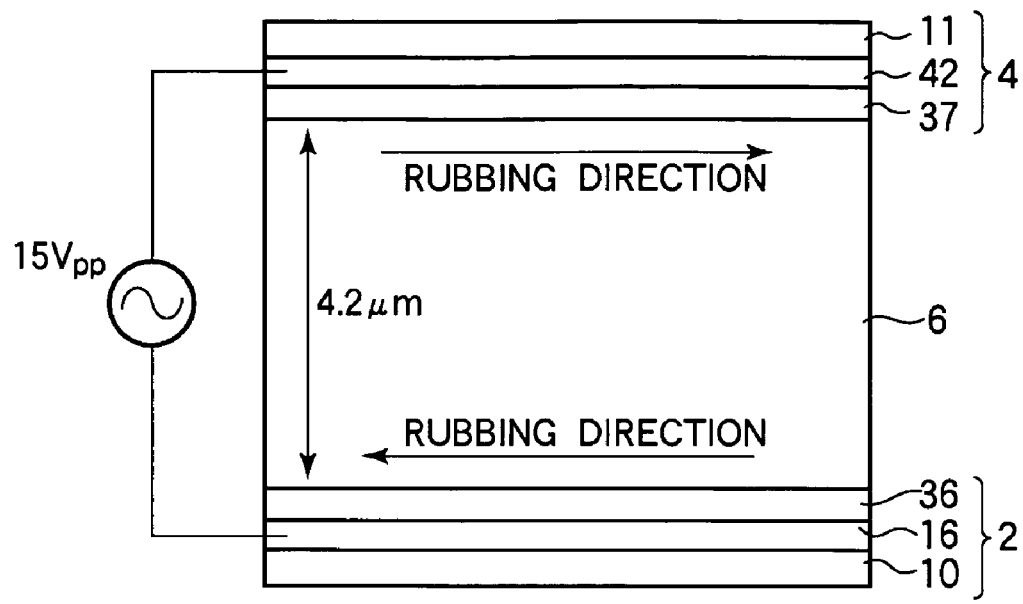
FIG. 9 is a diagram showing a configuration of a liquid crystal display according to Embodiment 1-4 in the first mode for carrying out the invention.

FIG. 9 shows a configuration of a liquid crystal display according to Embodiment 1-4. As shown in FIG. 9, a polyamic acid material manufactured by JSR Corp. was used for alignment films 36 and 37, and substrates 2 and 4 were rubbed on an anti-parallel basis. The substrates 2 and 4 were combined to fabricate an open cell. A liquid crystal added with 0.3% photo-polymeric bifunctional monomer by weight was injected in the vacant cell which was then irradiated with non-polarized UV light on an entire surface thereof. The UV light had irradiation intensity of 8 mW/cm$^2$ and irradiation energy of 9000 mJ/cm$^2$. The cell thickness was 4.2 μm. At this time, seven types of bifunctional monomers A to G were used as the monomer mixed in the liquid crystal, and changes in the pre-tilt angle of liquid crystal molecules were observed after applying a voltage of 15 Vpp AC to the liquid crystal for 24 hours. The results are shown in Table 1. The monomer G has a molecular length greater than that of the monomer F. As shown in Table 1, changes in the pre-tilt angle are small when materials having a ring system such as the monomers A to E are used. Among those monomers, the monomers A and C which had a smaller number of (or no) spacers (—CH$_2$—) between ring systems and the optically functional group provided better results.

TABLE 1

| Monomer | Ring System | Number of Spacers | Functional Group | Pre-Tilt Change |
|---|---|---|---|---|
| A | 2 Benzene Rings | 0 | Acrylate | <0.1 |
| B | 3 Benzene Rings | 1 | Acrylate | 0.2 |

TABLE 1-continued

| Monomer | Ring System | Number of Spacers | Functional Group | Pre-Tilt Change |
|---|---|---|---|---|
| C | 2 Benzene Rings | 0 | Methacrylate | <0.1 |
| D | 2 Aliphatic Rings | 1 | Acrylate | 0.8 |
| E | 2 Benzene Rings | 2 | Acrylate | 0.7 |
| F | None | — | Acrylate | 1.4 |
| G | None | — | Acrylate | 1.7 |

Table 2 shows a comparison of measurements of voltage retention rates. As shown in Table 2, when a monomer is mixed in a liquid crystal to form an ultraviolet-hardened material, in general, it is possible to achieve a voltage retention rate higher than that of a liquid crystal having no ultraviolet-hardened material formed therein.

TABLE 2

| Monomer | Measurement after 16.67 ms | Measurement after 1.667 s |
|---|---|---|
| None | 99.0% | 97.2% |
| A | 99.7% | 98.3% |
| C | 99.5% | 98.0% |

As described above, the present mode for carrying out the invention allows a transflective liquid crystal display, in particular, a transflective liquid crystal display utilizing a VA mode liquid crystal to achieve high display characteristics in both of the reflective and transmissive modes without making a cell thickness in reflective areas R smaller than cell thickness in transmissive areas T. When reflective areas R and transmissive areas T have substantially equal cell thicknesses, no large step will be formed at boundaries between the reflective areas R and the transmissive areas T. Therefore, no alignment defect of the liquid crystal 6 occurs, and the cell thicknesses can be easily controlled using spherical spacers. Further, since there is no need for forming leveling films only in reflective areas R, manufacturing processes can be simplified to allow a reduction in the manufacturing cost of a liquid crystal display.

In the present mode for carrying out the invention, since the alignment of a liquid crystal 6 can be controlled without forming alignment films or rubbing alignment films, manufacturing processes can be simplified, and the yield of manufacture can be improved, which makes it possible to reduce the manufacturing cost of a liquid crystal display. Further, in the present mode for carrying out the invention, the alignment of a liquid crystal 6 is controlled using alignment films and an ultraviolet-hardened material. This makes it possible to provide a liquid crystal display which is more reliable than liquid crystal displays according to the related art in which the alignment of a liquid crystal 6 is controlled using only alignment films.

[Second Mode for Carrying Out the Invention]

A liquid crystal display and a method of manufacturing the same in a second mode for carrying out the invention will now be described with reference to FIGS. 10 to 15A and 15B. Transmissive liquid crystal display according to the related art widely used for liquid crystal monitors have a problem in that they undergo a significant reduction in visibility due to the influence of light from their light sources in a bright environment e.g., an outdoor environment in fine weather, although they have sufficient visibility in a relatively dark environment, e.g., an indoor environment. Reflective liquid crystal displays used in electronic desk calculators are characterized in that they have sufficient visibility in a bright environment because display is performed utilizing light from a light source. On the other hand, a problem arises in that there is a significant reduction in visibility in a bright environment because the intensity of the light from the light source used for display is low. Under such circumstances, reflective/transmissive (transflective) liquid crystal displays having both of reflective and transmissive characteristics are attracting attention as liquid crystal displays that can be loaded in apparatus which must have sufficient visibility in any environment (e.g., mobile apparatus).

Figure 10:
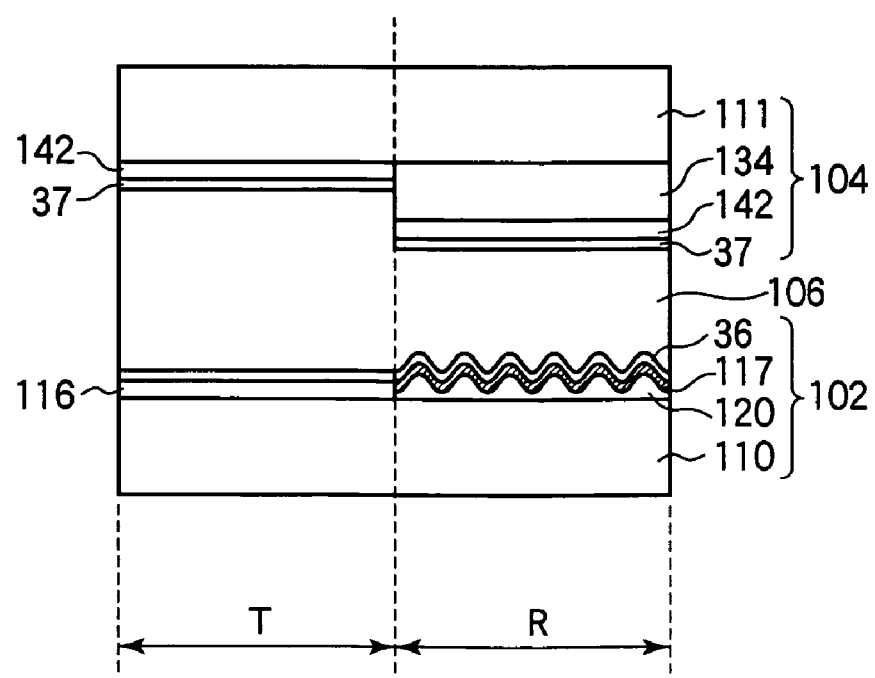
FIG. 10 is a sectional view showing a configuration of a common transflective liquid crystal display.
Figure 11:
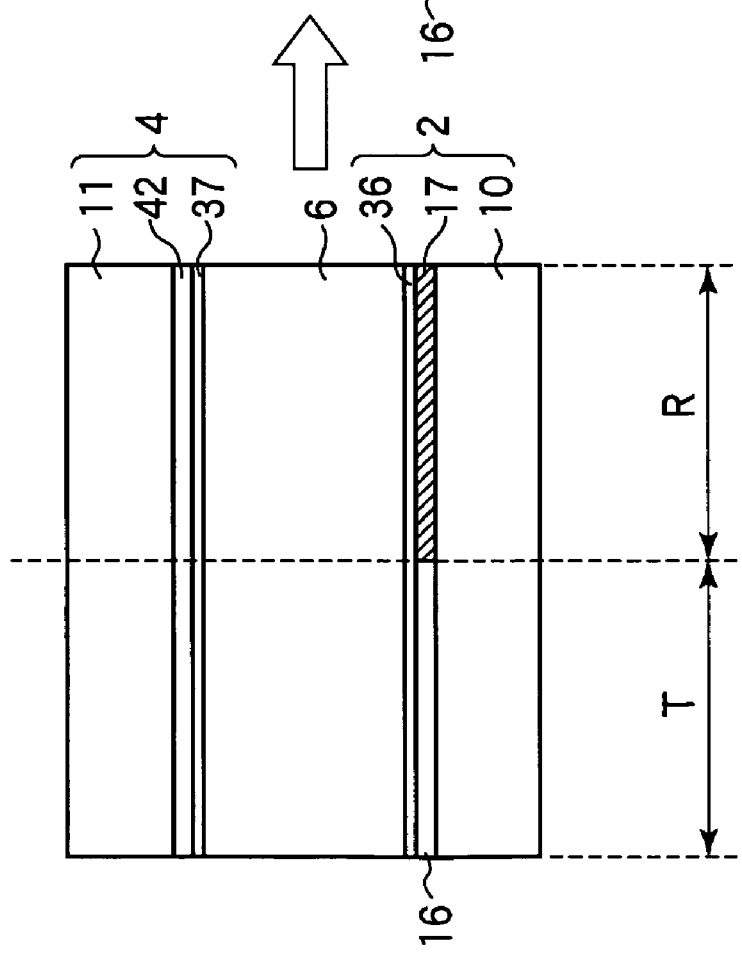
FIGS. 11A and 11B are diagrams showing a principle of a liquid crystal display in a second mode for carrying out the invention.

However, transflective liquid crystal displays have a problem in that they involve complicated manufacturing processes because both of a reflective area and a transmissive area must be formed in each pixel region. FIG. 10 shows a sectional configuration of a pixel of a common transflective liquid crystal display. As shown in FIG. 10, a first factor complicating manufacturing processes of the transflective liquid crystal display is that fact that only reflective area R must be selectively formed with a reflective electrode 117 for reflecting light and an irregular layer 120 for imparting light scattering capability to the reflective electrode 117 to cause scatter reflection of light. A second factor is the fact that there must be a difference in retardation in the liquid crystal layer between the reflective area R and transmissive area T because light passes through the liquid crystal layer different numbers of times in the areas R and T. According to the related art, in order to provide a liquid crystal layer with different values of retardation, it has been required to form a leveling film 134 only in a reflective area R to make a cell thickness in the reflective area R smaller than a cell thickness in a transmissive area T.

In the above-described first mode for carrying out the invention, an ultraviolet-hardened material is formed at substrate interfaces in the reflective area R such that modulation of light takes place differently in the reflective area R and transmissive area T to make retardation in the liquid crystal layer different between the areas R and T. This eliminates a need for forming a leveling film 134 to make manufacturing processes of a transflective liquid crystal display relatively simple.

However, the first factor described above still remains unsolved even in the first mode for carrying out the invention. For example, in order to impart light scattering capability to the reflective electrode 117, the irregular layer 120 must be selectively formed under the reflective electrode 117 in the reflective area R (see Patent Documents 1 and 7). Thus, manufacturing processes for a transflective liquid crystal display are still complicated in comparison to those for a reflective liquid crystal display or a transmissive liquid crystal display.

It is an object of the present mode for carrying out the invention to provide a transflective liquid crystal display and a method of manufacturing the same which can achieve high display characteristics in both of the reflective and transmissive modes and which allow manufacturing processes to be further simplified.

FIGS. 11A and 11B show a principle of a liquid crystal display in the present mode for carrying out the invention. FIG. 11A shows a state in which a monomer mixed in a liquid crystal 6 has not been polymerized yet, and FIG. 11B shows a state in which the monomer has been polymerized to form a hardened material 56. As shown in FIGS. 11A and 11B, in the present mode for carrying out the invention, the hardened material 56 that is formed by polymerizing a monomer at substrate interfaces is formed in different states in a reflective area R and a transmissive area T. Specifically, the hardened material 56 is formed with irregularities to provide it with light scattering capability. By forming the material in different states, retardation in a liquid crystal 6 in response to an applied voltage could be made to change differently in the reflective area R and the transmissive area T.

In the present mode for carrying out the invention, light scattering capability can be imparted to the reflective area R, and changes in retardation in the liquid crystal 6 in response to an applied voltage can be made different between the reflective area R and the transmissive area T using relatively simple manufacturing processes that can be easily carried out.

Liquid crystal displays and methods of manufacturing the same in the present mode for carrying out the invention will now be described with reference to specific embodiments thereof.

Embodiment 2-1

Embodiment 2-1 in the present mode for carrying out the invention will now be described with reference to FIGS. 11A and 11B. A product named OA-2 and manufactured by Nippon Electric Glass Co., Ltd. was used as glass substrates 10 and 11. The thickness of the substrates was 0.7 mm. A common electrode 42 that was a transparent electrode was formed on an entire surface of a substrate 4. A reflective electrode 17 having a substantially flat reflecting surface was formed in a reflective area R of another substrate 2, and a transparent electrode 16 was formed in a transmissive area T. An ITO was used as a material to form the transparent electrodes 42 and 16, and aluminum (Al) was used as a material to form the reflective electrode 17. An alignment film 37 was formed on the transparent electrode 42, and an alignment film 36 was formed on the transparent electrode 16 and the reflective electrode 17. Polyimide manufactured by JSR Corp. was used as a material to form the alignment films 36 and 37. The substrates 2 and 4 were combined with spacers (not shown) interposed between them to fabricate an open cell. Resin spacers manufactured by Sumitomo Fine Chemical Co., Ltd. were used as the spacers. The diameter of the spacers was 4 μm. Next, a mixture of a liquid crystal and a reactive monomer was injected into the open cell. A negative nematic liquid crystal manufactured by Merck KGaA was used as the liquid crystal material. A bifunctional monomer polymerized as a result of a reaction with UV light was used as the reactive monomer which was mixed with the liquid crystal so as to occupy 0.6%.

The cell having the mixture of the liquid crystal and the monomer injected therein was irradiated with UV light (having a wavelength of 365 nm) to polymerize the monomer, thereby forming a hardened material 56 for regulating liquid crystal alignment at substrate interfaces. At this time, the intensity of irradiation with UV light was varied between the reflective area R and the transmissive area T. The transmissive area T was irradiated with an intensity of 1 mW/cm$^2$, and the reflective area R was irradiated with an intensity of 30 mW/cm$^2$. The areas R and T were both irradiated with energy of 9000 mJ/cm$^2$ by irradiating them for different periods. A liquid crystal display of the present embodiment was fabricated through the above-described steps.

Figure 12:
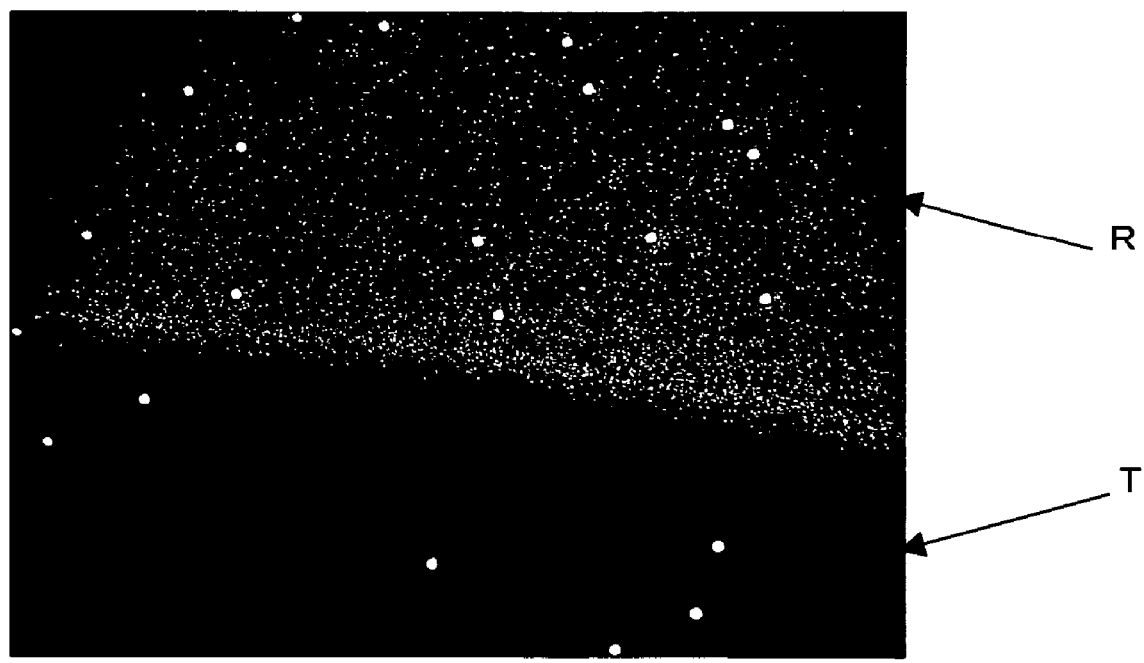
FIG. 12 is a diagram showing a configuration of a liquid crystal display according to Embodiment 2-1 in the second mode for carrying out the invention.

FIG. 12 is a view of the neighborhood of a boundary between the areas T and R of the liquid crystal display of the present embodiment, the view being taken substantially perpendicularly to the substrate surface. As seen in FIG. 12, it was observed that an irregular structure having light scattering capability was formed in the reflective area R shown in the upper part of the figure which had been irradiated with UV light having the higher intensity (30 mW/cm$^2$).

Figure 13:
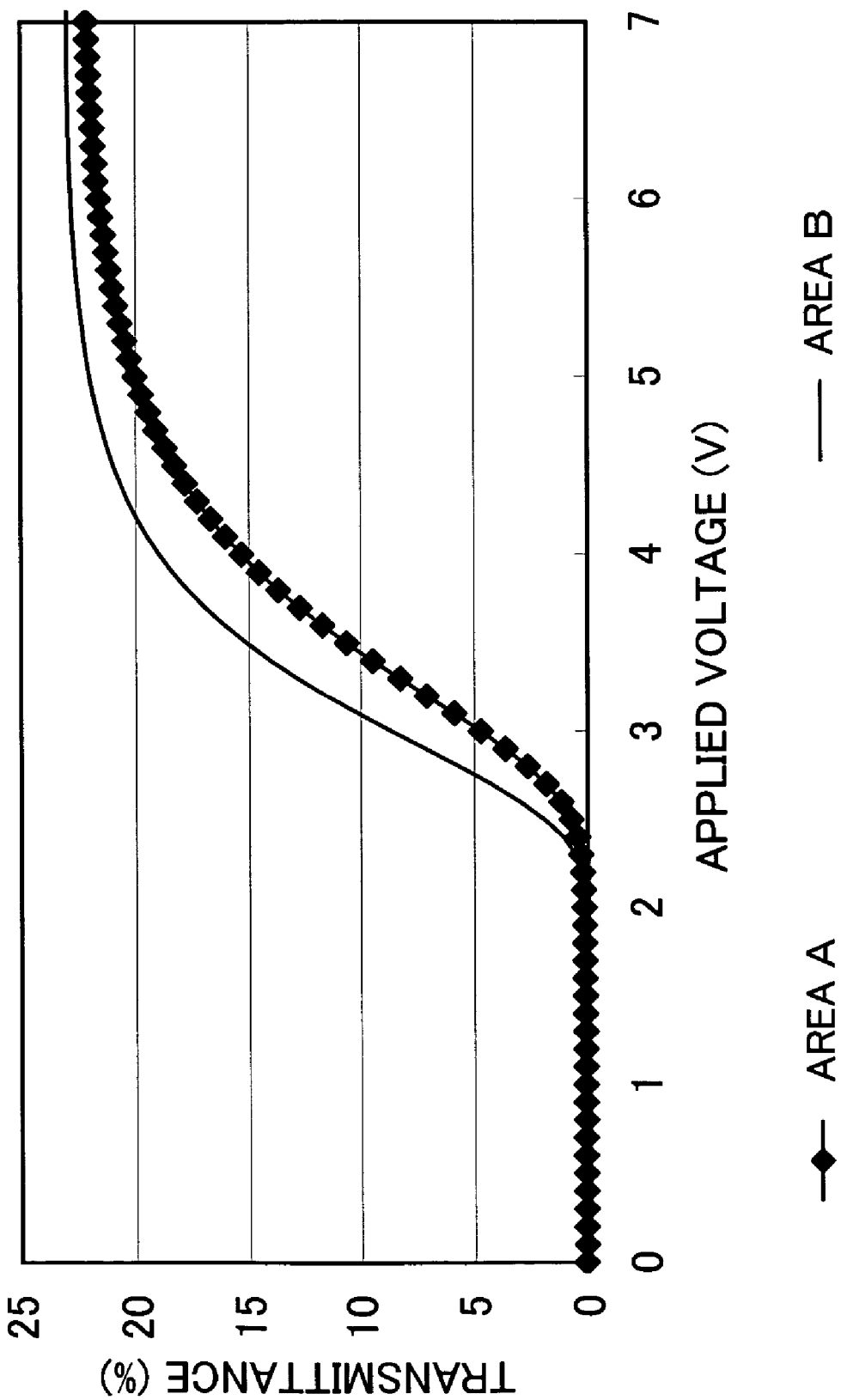
FIG. 13 is a graph showing T-V characteristics of the liquid crystal display according to Embodiment 2-1 in the second mode for carrying out the invention.

In order to study the relationship between the intensity of irradiation with UV light and transmittance characteristics (T-V characteristics), a liquid crystal display was fabricated through steps similar to those described above except that no reflective electrode 17 was formed. Specifically, no reflective area R was formed in the liquid crystal display; a certain region A of a transmissive area T was irradiated with UV light having the intensity of 30 mW/cm$^2$; and another region B was irradiated with UV light having the intensity of 1 mW/cm$^2$. FIG. 13 shows T-V characteristics of the regions A and B of the liquid crystal display. The abscissa axis represents applied voltages (V), and the ordinate axis represents transmittances (%). As shown in FIG. 13, the regions A and B have different T-V characteristics, and the T-V curve of the region A irradiated with UV light having the higher intensity is shifted to the high-voltage side compared to the T-V curve of the region B irradiated with UV light having the lower intensity. This means that retardation in the region A is smaller than retardation in the region B. That is, it is preferable to use the region A irradiated with UV light having the higher intensity as a reflective area R.

Therefore, since such a reflective area R is irradiated with UV light having an intensity higher than that for the transmissive area T, light scattering capability can be imparted to the reflective area R, and substantial retardation in the reflective area R can be made close to retardation in the transmissive area T. In the present embodiment, the reflecting surface of the reflective electrode 17 is substantially flat in the present embodiment. As a result, light can be more effectively scattered by a combination of the effect of scatter reflection caused by irregularities on the surface of the reflective electrode 17 and the effect of scattering caused by the hardened material 56 made of polymer.

Embodiment 2-2

Embodiment 2-2 in the present mode for carrying out the invention will now be described. FIGS. 14A and 14B show a configuration of a liquid crystal display of the present embodiment. FIG. 14A shows a state in which a monomer mixed in a liquid crystal 6 has not been polymerized yet, and FIG. 14B shows a state in which the monomer has been polymerized to form a hardened material 56. The liquid crystal display of the present embodiment is the same as Embodiment 2-1 except that alignment films 36 and 37 are not formed and that the liquid crystal is added with 2 wt % mixture of a bifunctional monomer and a monofunctional monomer having an alkyl chain. In the liquid crystal of the present embodiment, the alignment of the liquid crystal is regulated only by the hardened material 56 that is formed at substrate interfaces as a result of a reaction of the monomers. Light scattering capability and a shift of a T-V curve toward high voltages similar to those in Embodiment 2-1 were also observed in the liquid crystal display of the present embodiment.

Embodiment 2-3

Embodiment 2-3 in the present mode for carrying out the invention will now be described. FIGS. 15A and 15B show a configuration of a liquid crystal display of the present embodiment. FIG. 15A shows a state in which a monomer mixed in a liquid crystal 6 has not been polymerized yet, and FIG. 15B shows a state in which the monomer has been polymerized to form a hardened material 56. The liquid crystal display of the present embodiment is the same as Embodiment 2-2 except that a reaction accelerating layer 58 for accelerating a reaction of the monomer is formed on a reflective electrode 17 in a reflective area R. For example, when a CF layer including an optical polymerization initiator is used as the reaction accelerating layer 58, the embodiment requires no addition to manufacturing processes for a common reflective/transmissive liquid crystal display for color display. Thus, a greater amount of polymer (hardened material 56) is formed on the reflective electrode 17 to allow light to be scattered more effectively.

As described above, the present mode for carrying out the invention makes it possible to manufacture a transflective liquid crystal display which can achieve high display characteristics in both of the reflective and transmissive modes through simple manufacturing processes.

[Third Mode for Carrying Out the Invention]

Figure 16:
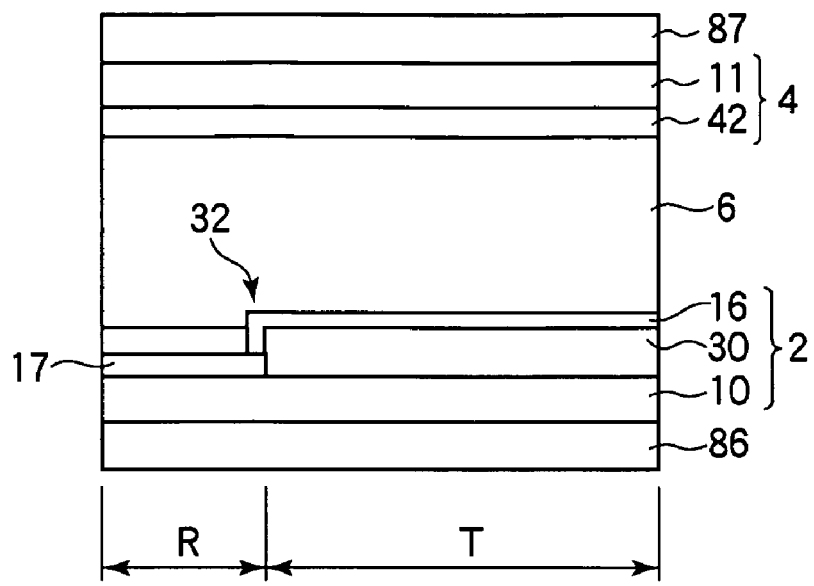
FIG. 16 is a diagram showing a first basic configuration of a liquid crystal display in a third mode for carrying out the invention.

A liquid crystal display in a third mode for carrying out the invention will now be described with reference to FIGS. 16 to 25A and 25B. FIG. 16 shows a first basic configuration of the liquid crystal display in the present mode for carrying out the invention. As shown in FIG. 16, a TFT substrate 2 has a reflective electrode 17 provided in a reflective area R. An insulation film 30 is formed throughout the substrate over the reflective electrode 17. A transparent electrode 16 is formed on the insulation film 30 in a transmissive area T. The transparent electrode 16 is electrically connected to the reflective electrode 17 through a contact hole 32 formed by providing an opening in the insulation film 30 above the reflective electrode 17. When a voltage is applied to a liquid crystal 6, the transparent electrode 17 and the reflective electrode 16 are at the same potential. However, since the insulation film 30 is formed on the reflective electrode 17, an effective voltage applied to the liquid crystal 6 in the reflective area R is lower than an effective voltage applied to the liquid crystal 6 in the transmissive area T because of a voltage loss at the insulation film 30. As a result, a threshold voltage in the reflective area R becomes higher than that in the transmissive area T. In this basic configuration, substantial retardation in the reflective area R is made close to retardation in the transmissive area T to make reflectance characteristics (R-V characteristics) close to T-V characteristics.

Figure 17:
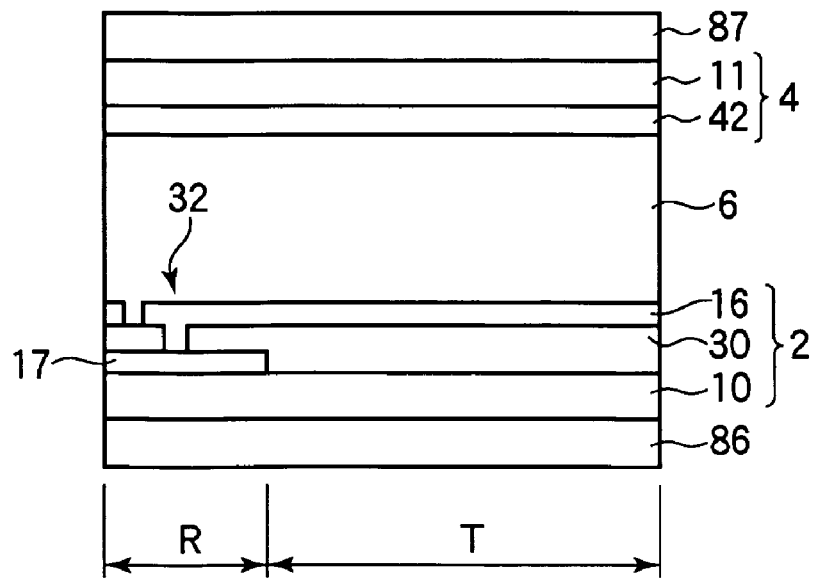
FIG. 17 is a diagram showing a second basic configuration of the liquid crystal display in the third mode for carrying out the invention.

FIG. 17 shows a second basic configuration of the liquid crystal display in the present mode for carrying out the invention. As shown in FIG. 17, a transparent electrode 16 formed in a transmissive area T extends into a part of a reflective area R. The transparent electrode 16 in the transmissive area T and the transparent electrode 16 in the reflective area R are electrically connected to each other.

FIGS. 18A to 18F show examples of shapes of a reflective electrode 17 and a transparent electrode 16 as viewed in a direction perpendicular to the substrate surface. FIGS. 18A to 18F show the reflective area R on the left side thereof and the transmissive area T on the right side thereof.

In the example shown in FIG. 18, the reflective electrode 17 is formed substantially throughout the reflective area R, and the transparent electrode 16 is formed substantially throughout the transmissive area T. The transparent electrode 16 extends into a part of the reflective area R. The transparent electrode 16 in the reflective area R has a trunk section 16a extending in the vertical direction in the figure and a plurality of branch sections 16b branching from the trunk section 16a to extend in diagonal directions. An effective voltage applied to the liquid crystal 6 is lower in the reflective area R which is only partially occupied by the transparent electrode 16 than in the transmissive area T which is substantially entirely occupied by the transparent electrode 16. In the reflective area R, since liquid crystal molecules are tilted in the extending directions of the branch sections 16b by diagonal electric fields generated at the edges of the transparent electrode 16, the alignment of the liquid crystal 6 can be regulated. Thus, the transparent electrode 16 formed in a part of the reflective area R not only provides optical characteristics such as a saturation voltage and threshold characteristics in accordance with those in the transmissive area T but also divides the alignment of liquid crystal 6 in the reflective area R to allow viewing angle characteristics to be improved during reflective display.

In the example shown in FIG. 18B, the transparent electrode 16 in the reflective area R has a plurality of linear electrodes 16c radially extending substantially from the center of the reflective area R. In the reflective area R, since liquid crystal molecules are tilted in the extending direction of the linear electrodes 16c, the alignment of the liquid crystal 6 can be regulated.

In the example shown in FIG. 18C, the transparent electrode 16 in the reflective area R has a plurality of circular openings 18a arranged in the form of a matrix. In the reflective area R, since liquid crystal molecules are tilted outwardly from the center of each of the openings 18a, the alignment of the liquid crystal 6 can be regulated. The openings 18a may be in other configurations such as polygonal and radial configurations.

In the example shown in FIG. 18D, the transparent electrode 16 in the reflective area R has a plurality of linear openings 18b extending in parallel with each other in the horizontal direction in the figure. In the reflective area R, liquid crystal molecules are tilted in the extending direction of the openings 18b, the alignment of the liquid crystal 6 can be regulated.

In the example shown in FIG. 18E, the transparent electrode 16 in the transmissive area T has a rectangular solid section 16d provided in the middle thereof and comb-shaped section 16e extending outwardly and diagonally from the periphery of the solid section 16d. The transparent electrode 16 in the reflective area R has an opening 18c provided in the middle of the reflective area R, a frame-shaped section 16f in the form of a frame surrounding the opening 18c, and a comb-shaped section 16e outwardly and diagonally extending from the periphery of the frame-shaped section 16f. The opening 18c is provided to make an effective voltage applied to the liquid crystal 6 in the reflective area R lower than an effective electrode applied to the liquid crystal 6 in the transmissive area T by making the surface area of the transparent electrode 16 in the reflective area R smaller than the surface area of the transparent electrode 16 in the transmissive area T. The alignment of the liquid crystal 6 can be regulated in the transmissive area T and the reflective area R because liquid crystal molecules are tilted along the comb-shaped section 16e. By shaping the transparent electrode 16 so as to control the alignment of the liquid crystal 6 not only in the reflective area R but also in the transmissive area T as thus described, the alignment of the liquid crystal 6 can be divided in the transmissive area T, and viewing angle characteristics can be improved during transmissive display.

In the example shown in FIG. 18F, the transparent electrode 16 in the transmissive area T has a solid section 16d and a comb-shaped section 16e. The transparent electrode 16 in the reflective area R has a plurality of rhombic electrodes 16k extending in the vertical direction in the figure. The rhombic electrodes 16k are electrically connected to each other. The alignment of the liquid crystal 6 can be regulated because liquid crystal molecules are tilted along the comb-shaped section 16e in the transmissive area T and are tilted along the extending direction of the rhombic electrodes 16k in the reflective area R.

Figure 19:
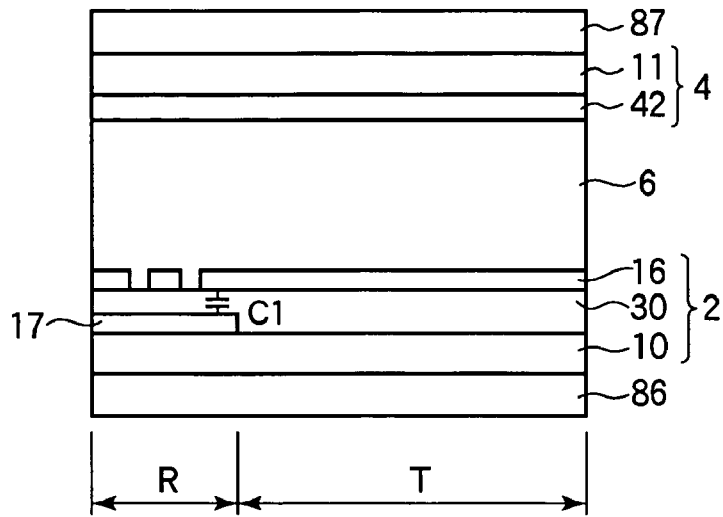
FIG. 19 is a diagram showing a third basic configuration of the liquid crystal display in a third mode for carrying out the invention.

FIG. 19 shows a third basic configuration of the liquid crystal display in the present mode for carrying out the invention. As shown in FIG. 19, a transparent electrode 16 formed in a transmissive area T extends into a part of a reflective area R. The transparent electrode 16 and a reflective electrode 17 are connected through a capacity C1. By applying a predetermined AC voltage between the reflective electrode 17 and a common electrode 42, a predetermined voltage is applied to a liquid crystal 6 based on a capacity ratio between a liquid crystal capacity and the capacity C1. An effective voltage applied to the liquid crystal 6 is lower in the reflective area R which is only partially occupied by the transparent electrode 16 than in the tranmissive area T which is substantially entirely occupied by the transparent electrode 16. When a voltage is applied to the liquid crystal 6, the transparent electrode 16 and the reflective electrode 17 are at different potentials. The transparent electrode 16 in the reflective area R is formed in shapes as shown in FIGS. 18A to 18F or other shapes.

Figure 20:
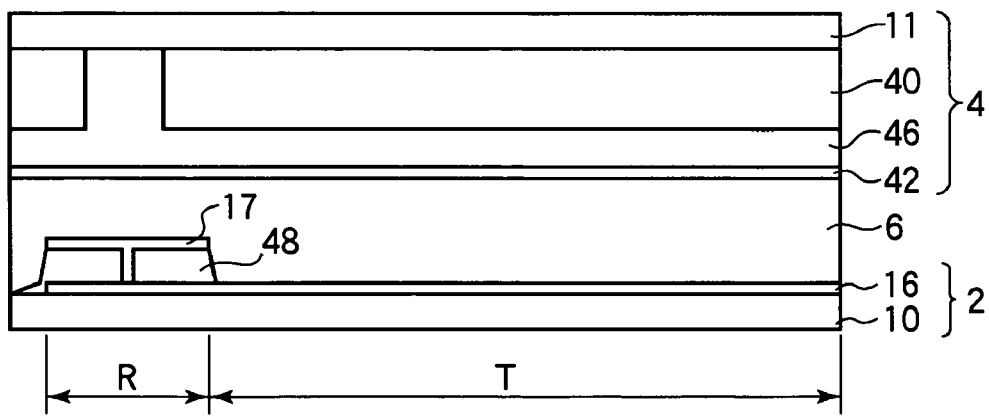
FIG. 20 is a diagram showing a configuration of a liquid crystal display which constitutes a basis of a fourth basic configuration of the liquid crystal display in the third mode for carrying out the invention.

A fourth basic configuration of the liquid crystal display in the present mode for carrying out the invention will now be described. FIG. 20 shows a configuration of a transflective liquid crystal display which constitutes a basis of the present basic configuration. As shown in FIG. 20, a TFT substrate 2 has a transparent electrode 16 formed in a transmissive area T and a reflective area R. A resin layer 48 for making a cell thickness in the reflective area R smaller than a cell thickness in the transmissive area T is formed on the transparent electrode 16 in the reflective area R. Irregularities are formed on the surface of the resin layer 48. A reflective electrode 17 is formed on the resin layer 48. Irregularities that follow the surface of the resin layer 48 are formed on the surface of the reflective electrode 17. The reflective electrode 17 and the transparent electrode 16 are electrically connected to each other.

An opposite substrate 4 has a CF layer 40 which is formed substantially throughout the transmissive area T and in a part of the reflective area R. The CF layer 40 is formed only in a part of the reflective area R instead of forming it throughout the area to achieve the same color purity in both of the reflective and transmissive display modes. A leveling film 46 is formed throughout the substrate over the CF layer 40. A common electrode 42 is formed on the leveling film 46.

In this transflective liquid crystal display, since the cell thicknesses in the tranmissive area T and the reflective area R are different from each other, defects of alignment of the liquid crystal 6 can occur. Further, additional manufacturing steps are required because the leveling film 46 is required to level the CF layer 40 which is partially removed in the reflective area R.

Figure 21:
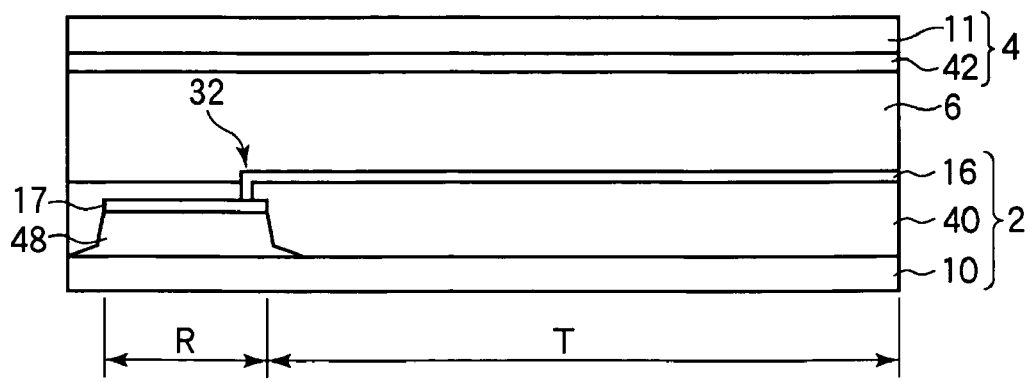
FIG. 21 is a diagram showing the fourth basic configuration of the liquid crystal display in the third mode for carrying out the invention.

FIG. 21 is a sectional view showing a fourth basic configuration of the liquid crystal display in the present mode for carrying out the invention. As shown in FIG. 21, a transmissive liquid crystal display having the present basic configuration has a CF-on-TFT structure in which a CF layer 40 is provided on a TFT substrate 2. A resin layer 48 is formed in a reflective area R. Irregularities are formed on the surface of the resin layer 48. A reflective electrode 17 is formed on the resin layer 48. Irregularities that follow the irregularities on the surface of the resin layer 48 are formed on the surface of the reflective electrode 17. A CF layer 40 having insulating properties is formed on the reflective electrode 17 in the reflective area R and also in a transmissive area T. The surface of the CF layer 40 is substantially flat. A transparent electrode 16 is formed on the CF layer 40 in the transmissive area T. The transparent electrode 16 is electrically connected to the reflective electrode 17 through a contact hole 32 which is formed by providing an opening in the CF layer 40. The thickness of the CF layer 40 in the reflective area R is smaller than the thickness of the CF layer 40 in the transmissive area T by an amount equivalent to the sum of the thicknesses of the reflective electrode 17 and the resin layer 48. The thickness of the CF layer 40 in the reflective area R can be made substantially equal to one-half of the thickness of the CF layer 40 in the transmissive area T by forming the resin layer 48 with a thickness that is substantially one-half of the thickness of the CF layer 40. A liquid crystal in the TN mode, VA mode or HAN (Hybrid Aligned Nematic) mode is used as the liquid crystal 6. The transparent electrode 16 may be formed in a predetermined shape also in a part of the reflective area R to regulate the alignment of the liquid crystal 6. The surface of the reflective electrode 17 may be formed like a mirror surface when a forward scattering film is separately provided as a light scattering section on the viewer's side of the reflective electrode 17.

In this basic configuration, the CF layer 40 is formed with a substantially flat surface. Since this eliminates a need for forming a leveling film 46 on the CF layer 40, manufacturing steps are simplified. Further, the CF layer 40 in the reflective area R can be formed with a thickness smaller than the thickness of the CF layer 40 in the transmissive area T, substantially the same color purity can be achieved in both of the reflective and transmissive display modes.

Liquid crystal displays and methods of manufacturing the same in the present mode for carrying out the invention will now be described with specific embodiments thereof.

Embodiment 3-1

Figure 22:
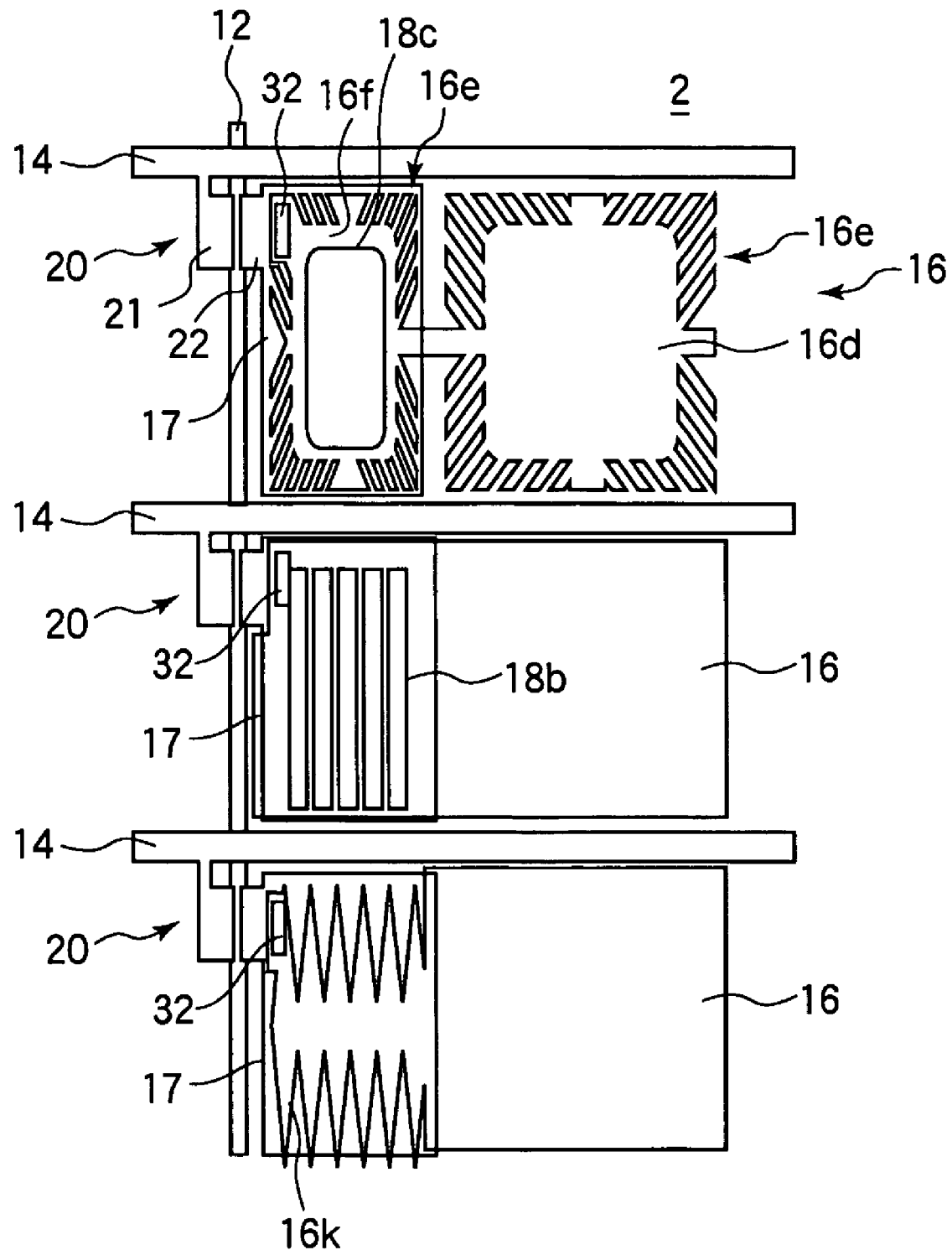
FIG. 22 is a diagram showing a configuration of a liquid crystal display according to Embodiment 3-1 in the third mode for carrying the invention.

First, a liquid crystal display according to Embodiment 3-1 in the present mode for carrying out the invention will be described. FIG. 22 shows a configuration of the liquid crystal display of the present embodiment. The present embodiment is an example of the application of configurations shown in FIG. 17 and FIGS. 18A to 18F to an active matrix type liquid crystal display having a TFT at each pixel. FIG. 22 shows a configuration of three pixels. As shown in FIG. 22, gate bus lines 12 for supplying scan signals are formed on a TFT substrate 2 so as to extend in the vertical direction in the figure. Drain bus lines 14 for supplying display signals are formed so as to extend in the horizontal direction in the figure across the gate bus lines 12 with an insulation film (not shown) interposed therebetween. TFTs 20 are formed in the vicinity of intersections between the bus lines 12 and 14. A drain electrode 21 of a TFT 20 is electrically connected to a drain bus line 14. A reflective electrode 17 and a transparent electrode 16 are formed in a region surrounded by gate bus lines 12 and drain bus lines 14. The reflective electrode 17 is formed substantially throughout a reflective area R such that, for example, it is integral with a source electrode 22 of the associated TFT 20 residing in the same layer. The manufacturing steps for the liquid crystal display can be simplified by forming the reflective electrode 17 and the source electrode 22 in the same layer. Further, the reflective electrode 17 may be formed integrally with a storage capacitor electrode (intermediate electrode) formed at each pixel as one of electrodes of a storage capacitor. However, a forward scattering film must be separately provided on a polarizer when no irregularity is formed on the surface of the reflective electrode 17.

In the uppermost pixel region among the three pixel regions arranged in the vertical direction in the figure, a transparent electrode 16 in a transmissive area T has a rectangular solid section 16d provided in the middle and a comb-shaped section 16e outwardly and diagonally extending from the periphery of the solid section 16d. A transparent electrode 16 in a reflective area R has an opening 18c provided in the middle of the reflective area R, a frame-shaped section 16f in the form of a frame surrounding the opening 18c, and a comb-shaped section 16e outwardly and diagonally extending from the periphery of the frame-shaped section 16f.

In the middle pixel region, a transparent electrode 16 is formed substantially throughout a transmissive area T, and a plurality of linear openings 18b extending in parallel with each other in the vertical direction in the figure are provided in a reflective area R. In the bottom pixel region, a transparent electrode 16 is formed substantially throughout a transmissive area T, and a plurality of rhombic electrodes 16k extending in the vertical direction in the figure in electrically connection with each other are provided in a reflective area R. Although the shape of the transparent electrode 16 varies from pixel to pixel in the present embodiment, the transparent electrodes 16 in those pixels may obviously have the same shape.

Embodiment 3-2

A liquid crystal display according to Embodiment 3-2 in the present mode for carrying out the invention will now be described. In the liquid crystal display of Embodiment 3-1 described above, a significant optical loss can occur because light is blocked by the gate bus lines 12, the drain bus lines 14 and the TFTs 20. For this reason, in the present embodiment, a reflective electrode 17 is provided such that it overlaps a gate bus line 12, drain bus line 14 or TFT 20.

Figure 23A:
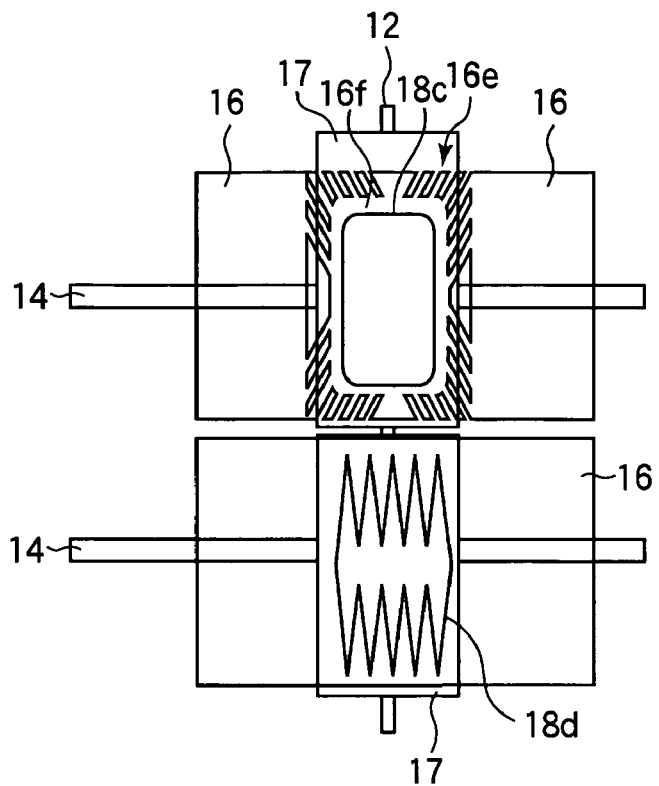
FIGS. 23A and 23B are diagrams showing a configuration of a liquid crystal display according to Embodiment 3-2 in the third mode for carrying the invention.
Figure 23B:
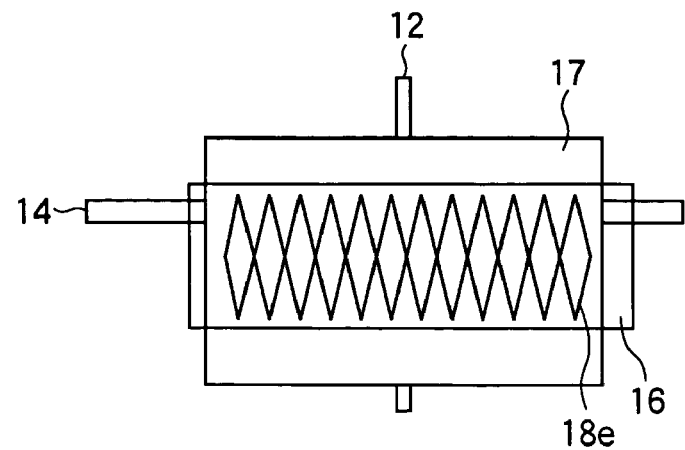

FIGS. 23A and 23B show a configuration of the liquid crystal display of the present embodiment. In FIGS. 23A and 23B, a reflective area R is formed in the middle of the figures, and transmissive areas T are formed on both sides of the same. As shown in FIGS. 23A and 23B, a reflective electrode 17 is provided such that it overlaps a TFT 20. A transparent electrode 16 is formed substantially throughout the transmissive areas T. In the upper pixel region in FIG. 23A, a transparent electrode 16 in the reflective area R has an opening 18c provided in the middle of the reflective area R, a frame-shaped section 16f in the form of a frame surrounding the openings 18c, and a comb-shaped section 16e outwardly and diagonally extending from the periphery of the frame-shaped section 16f. In the lower pixel region in FIG. 23A, a transparent electrode 16 in a reflective area R has openings 18d in the form of a plurality of vertically elongate rhombuses connected in the horizontal direction in the figure. In the pixel region shown in FIG. 23B, a transparent electrode 16 in a reflective area R has a plurality of openings 18e in the form of rhombuses that are elongate in the vertical direction in the figure. In the present embodiment, since regions subjected to optical loss are reduced, it is possible to provide a high quality transflective liquid crystal display in which light is efficiently utilized and which has a wide color reproduction range.

Embodiment 3-3

Figure 24A:
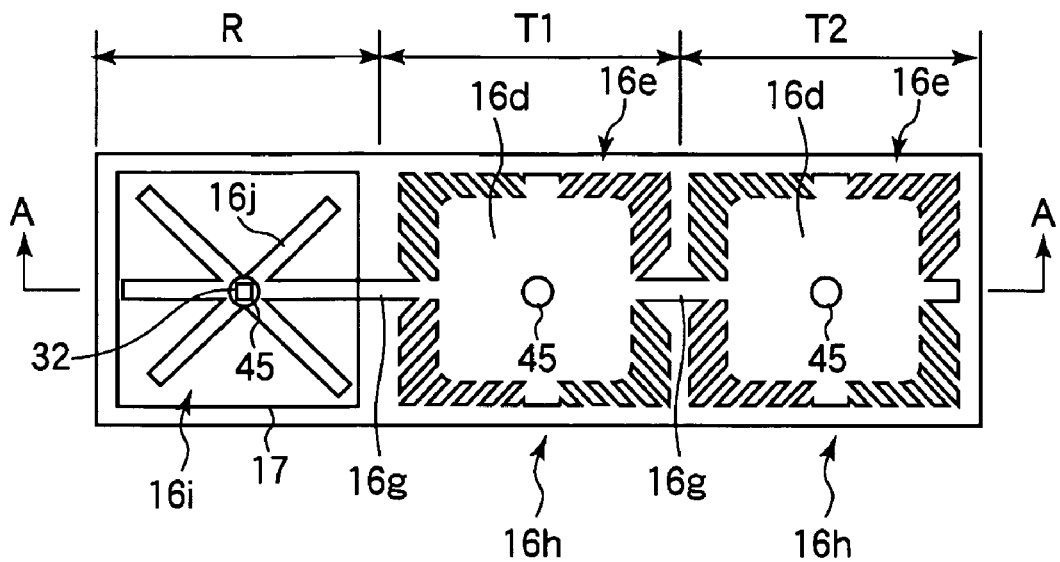
FIGS. 24A and 24B are diagrams showing a configuration of a liquid crystal display according to Embodiment 3-3 in the third mode for carrying the invention.
Figure 24B:
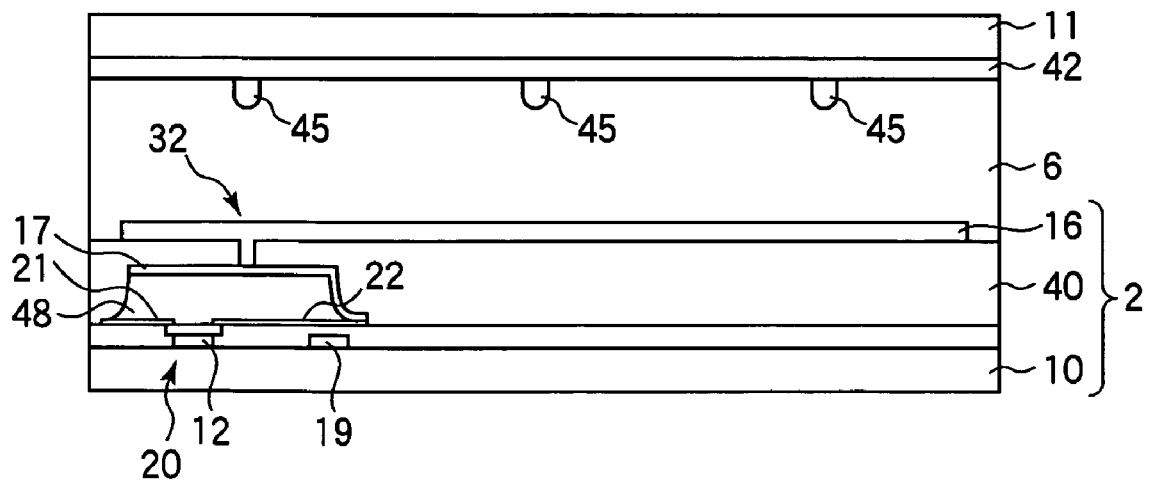
Figure 26:
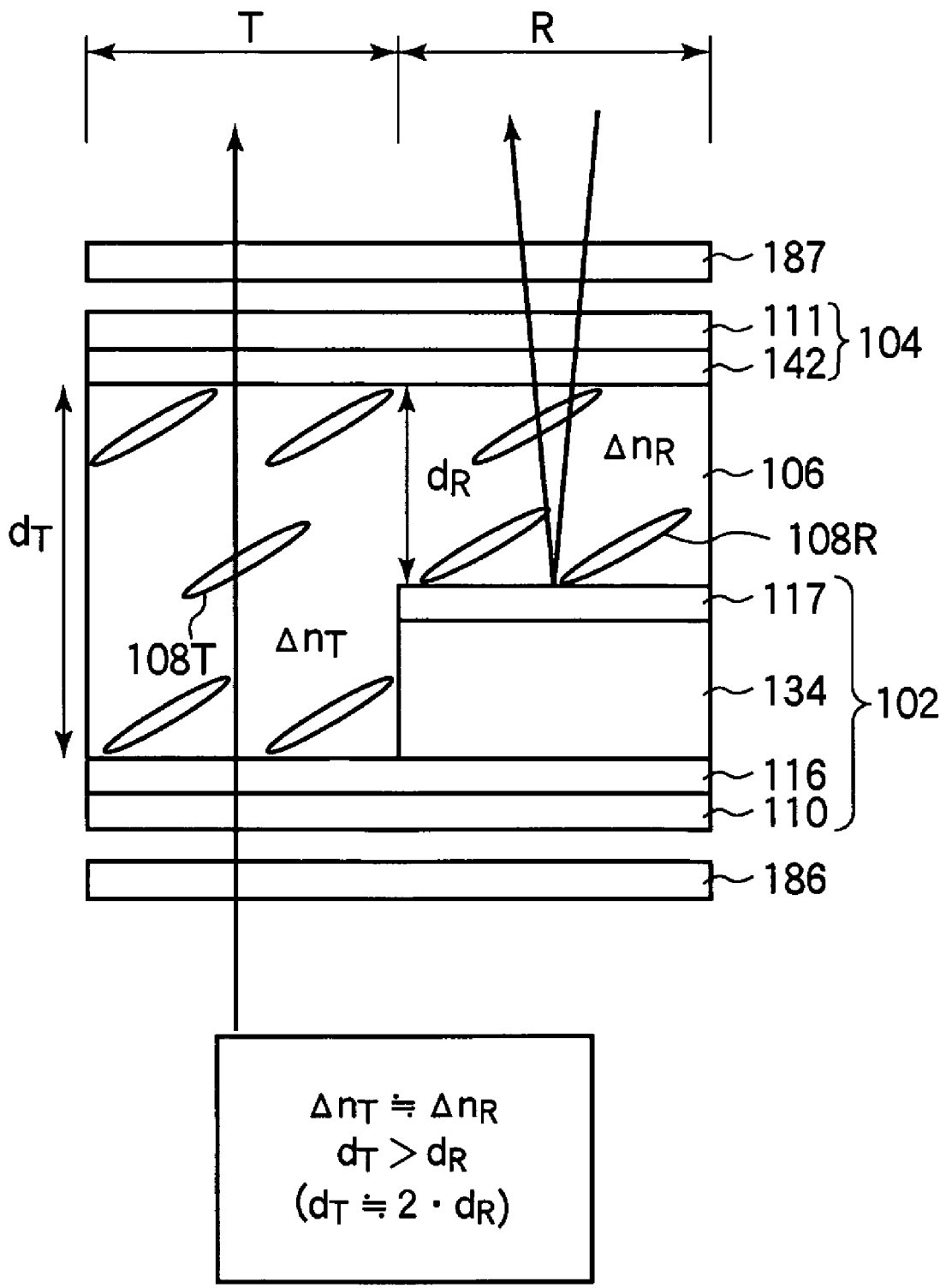
FIG. 26 is a diagram showing a sectional configuration of a transflective liquid crystal display according to the related art.

A liquid crystal display according to Embodiment 3-3 in the present mode for carrying out the invention will now be described. FIG. 24A shows a configuration of one pixel of the liquid crystal display of the present embodiment, and FIG. 24B schematically shows a sectional configuration of the liquid crystal display taken along the line A-A in FIG. 24A. As shown in FIGS. 24A and 24B, the pixel region is generally divided into three areas which are adjacent to each other in the horizontal direction in the figures. The left part of the pixel region is a reflective area R. The middle and right parts of the region are transmissive areas T1 and T2, respectively. A TFT 20 is formed in the reflective area R which is located on a glass substrate 10. A resin layer 48 having a predetermined thickness is formed on the TFT 20 in the reflective area R. A reflective electrode 17 is formed on the resin layer 48. The reflective electrode 17 is electrically connected to a source electrode 22 of the TFT 20 (and a storage capacitor electrode provided opposite to a storage capacitor bus line 19) through a contact hole 32. A CF layer 40 is formed on the reflective electrode 17 in the reflective area R and also in the transmissive areas T1 and T2. The surface of the CF layer 40 is substantially flat. For example, the thickness of the CF layer 40 in the reflective area R is one-half of the thickness of the same in the transmissive areas T1 and T2.

A transparent electrode 16 is formed on the CF layer 40. The transparent electrode 16 has an electrode unit 16h formed in each of the transmissive areas T1 and T2, an electrode unit 16i formed in the reflective area R and having an electrode area smaller than that of the electrode units 16h, and connection electrodes 16g for connecting the electrode units 16h and 16i which are adjacent to each other. The electrode units 16h in the transmissive areas T1 and T2 have a solid section 16d provided in the middle thereof and a comb-shaped section 16e for regulating the alignment of a liquid crystal 6 in the form of comb teeth extending outwardly and diagonally from the periphery of the solid section 16d. The electrode unit 16i in the reflective area R has a plurality of linear electrodes 16j radially extending substantially from the center of the reflective area R. For example, the electrode unit 16i is formed like the symbol "*". The transparent electrode 16 is electrically connected to the reflective electrode 17 through the contact hole 32 that is formed substantially in the middle of the reflective area R. An opposite substrate 4 is formed with a point-like protrusion 45 for regulating the alignment of the liquid crystal 6 located in the middle of each of the reflective area R and the transmissive areas T1 and T2. The provision of the point-like protrusions 45 makes it possible to achieve domain division for dividing the alignment of the liquid crystal 6 into a plurality of directions in the pixel region without rubbing. The present embodiment makes it possible to provide a high quality liquid crystal display in which light is efficiently utilized and which has a wide color reproduction range.

Embodiment 3-4

A liquid crystal display according to Embodiment 3-4 in the present mode for carrying out the invention will now be described. FIGS. 25A and 25B show a configuration of the liquid crystal display of the present embodiment and a method of manufacturing the same. As shown in FIG. 25A, a TFT substrate 2 of the liquid crystal display of the present embodiment has a reflective electrode 17 formed in a reflective area R, and insulation film (leveling film) 30 formed throughout the substrate over the reflective electrode 17, and a transparent electrode 16 formed in the reflective area R over the insulation film 30 and formed substantially throughout a transmissive area T (or in part of the reflective area R and substantially throughout the transmissive area T). In the present embodiment, the TFT substrate 2 is combined with an opposite substrate 4, and a liquid crystal 6 added with a photo-polymeric monomer such as acrylate is injected between the substrates 2 and 4. Next, the reflective area R is irradiated with UV light through a shielding mask 54a for shielding the transmissive area T from light while applying a predetermined voltage V1 between the transparent electrode 16 and a common electrode 42. As a result, the photo-polymeric monomer added in the liquid crystal 6 is polymerized in the reflective area R to form polymer layers for regulating the alignment of the liquid crystal 6 at substrate interfaces in the reflective area R.

Next, the transmissive area T is irradiated with UV light through a shielding mask 54b for shielding the reflective area R from light while applying a voltage V2 higher than the voltage V1 (V2>V1) between the transparent electrode 16 and the common electrode 42. As a result, the photo-polymeric monomer added in the liquid crystal 6 is polymerized in the transmissive area T to form polymer layers for regulating the alignment of the liquid crystal 6 at substrate interfaces in the transmissive area T. The capability of the polymer layers in controlling the alignment of the liquid crystal 6 can be varied by irradiating the reflective area R and the transmissive area T with UV light while applying respective voltages different from each other, which makes it possible to threshold characteristics of the liquid crystal 6 in the reflective area R and the transmissive area T. It is therefore possible to make optical characteristics in the reflective and transmissive modes close to each other.

Embodiment 3-5

A liquid crystal display according to Embodiment 3-5 will now be described. In the present embodiment, for example, a TFT substrate 2 and an opposite substrate 4 having electrodes in a configuration similar to those in Embodiments 3-1 to 3-3 are combined without forming alignment films on surfaces of the substrates 2 and 4 facing each other. Subsequently, a liquid crystal 6 added with a photo-polymeric monomer is injected, and irradiation with UV light is carried out while applying a predetermined voltage between a transparent electrode 16 and a common electrode 42. Thus, polymer layers are formed at substrate interfaces. Since an effective voltage applied to the liquid crystal 6 varies between a reflective area R and a transmissive area T, polymer layers formed in the reflective area R and the transmissive area T are different from each other in the capability of controlling the alignment of the liquid crystal 6. Thus, threshold characteristics of the liquid crystal 6 in the reflective area R and the transmissive area T can be controlled, and optical characteristics in the reflective and transmissive modes can be made close to each other. In the present embodiment, since the step of applying alignment films can be deleted, manufacturing processes for a liquid crystal display can be further simplified.

As described above, in the present mode for carrying out the invention, a transflective liquid crystal display, more particularly, a transflective liquid crystal display utilizing a VA mode liquid crystal 6 can achieve high display characteristics in both of the reflective and transmissive modes even when a cell thickness in a reflective area R and a cell thickness in a transmissive area T are substantially equal to each other. Therefore, no large step is formed at a boundary between the reflective area R and the transmissive area T, which eliminates alignment defects of the liquid crystal 6 and facilitates control of the cell thickness using spherical spacers. The liquid crystal 6 has substantially the same response speed in the reflective area R and the transmissive area T. Further, since there is no need for forming a leveling film only in a reflective area R, it is possible to simplify manufacturing processes to reduce the manufacturing cost of a liquid crystal display.

What is claimed is:

1. A liquid crystal display comprising:
a pair of substrates provided opposite to each other;
a liquid crystal sealed between the pair of substrates;
a plurality of pixel regions each having a reflective area which reflects light from the side of one of the pair of substrates and a transmissive area which transmits light from the side of the other of the pair of substrates toward the one of the pair of substrates; and
an ultraviolet-hardened material which is a product of polymerization of a polymeric component mixed in the liquid crystal with ultraviolet light and which is mainly formed in the neighborhood of an interface between the liquid crystal and the pair of substrates to change the anchoring energy of a part of the liquid crystal in the pixel region,
wherein a cell thickness in the reflective area is substantially equal to a cell thickness in the transmissive area, and
wherein the ultraviolet-hardened material is formed in one of the reflective area and the transmissive area.

2. A liquid crystal display according to claim 1, wherein the ultraviolet-hardened material includes a compound having a ring system.

3. A liquid crystal display according to claim 1, wherein an alignment film for controlling the alignment of the liquid crystal is not formed, through coating, at least in a part of the neighborhood of the interface between the pair of substrates and the liquid crystal.

4. A liquid crystal display according to claim 1, wherein the liquid crystal has negative dielectric constant anisotropy and is aligned substantially perpendicularly to a surface of the substrates when no voltage is applied.

5. A liquid crystal display according to claim 1, further comprising a pair of polarizers is provided so as to sandwich the pair of substrates,
wherein the pair of polarizers is a combination of two linear polarizers or two circular polarizers or a linear polarizer and a circular polarizer.

6. A liquid crystal display comprising:
a pair of substrates provided opposite to each other;
a liquid crystal sealed between the pair of substrates;
a plurality of pixel regions each having a reflective area which reflects light from the side of one of the pair of substrates and a transmissive area which transmits light from the side of other of the pair of substrates toward the one of the pair of substrates; and
an alignment control layer formed in the vicinity of an interface between the pair of substrates and the liquid crystal, for controlling the alignment of the liquid crystal in the pixel region with alignment control capability which varies between the reflective area and the transmissive area,
wherein the alignment control layer includes an ultraviolet-hardened material formed as a result of polymerization of a polymeric component mixed in the liquid crystal caused by ultraviolet light and an alignment film formed, through coating, on a surface of the substrates, and
a cell thickness in the reflective area is substantially equal to a cell thickness in the transmissive area.

7. A method of manufacturing a liquid crystal display having a plurality of pixel regions each having a reflective area which reflects light from the side of one of a pair of substrates provided opposite to each other and a transmissive area which transmits light from the side of the other of the pair of substrates toward the one of the pair of substrates, the method comprising the steps of:

sealing a liquid crystal including a polymeric component polymerized by ultraviolet light between the pair of substrates;

irradiating the liquid crystal with ultraviolet light through a shielding mask formed with a shielding pattern in a part thereof; and polymerizing the polymeric component to form an ultraviolet-hardened material for changing the anchoring energy in the neighborhood of an interface between the pair of substrates and the liquid crystal, wherein a cell thickness in the reflective area is substantially equal to a cell thickness in the transmissive area, and wherein the ultraviolet-hardened material is formed in one of the reflective area and the transmissive area.

8. A method of manufacturing a liquid crystal display having a plurality of pixel regions each having a reflective area which reflects light from the side of one of a pair of substrates provided opposite to each other and a transmissive area which transmits light from the side of the other of the pair of substrates toward the one of the pair of substrates, the method comprising the steps of:

sealing a liquid crystal including a polymeric component polymerized by ultraviolet light between the pair of substrates;

irradiating a part of the liquid crystal with ultraviolet light incident upon a surface of the substrates in an oblique direction; and polymerizing the polymeric component to form an ultraviolet-hardened material in the neighborhood of an interface between the pair of substrates and the liquid crystal, wherein a cell thickness in the reflective area is substantially equal to a cell thickness in the transmissive area, and wherein the ultraviolet-hardened material is formed in one of the reflective area and the transmissive area.

9. A liquid crystal display comprising:

a pair of substrates provided opposite to each other;

a liquid crystal sealed between the pair of substrates;

a plurality of pixel regions each having a reflective area which reflects light from the side of one of the pair of substrates and a transmissive area which transmits light from the side of the other of the pair of substrates toward the one of the pair of substrates; and an ultraviolet-hardened material which is a product of polymerization of a polymeric component mixed in the liquid crystal with ultraviolet light and which is formed in the reflective area and the transmissive area to impart light scattering capability for scattering light to the reflective area.

10. A liquid crystal display according to claim 9, wherein:

the ultraviolet-hardened material in the transmissive area is formed by ultraviolet light having a first irradiation intensity; and the ultraviolet-hardened material in the reflective area is formed by ultraviolet light having a second irradiation intensity higher than the first irradiation intensity.

11. A liquid crystal display according to claim 10, wherein a reflective electrode formed in the reflective area has a substantially flat reflecting surface.

12. A liquid crystal display according to claim 9, wherein a change of retardation in a liquid crystal layer varies between the reflective area and the transmissive area when a voltage applied to the liquid crystal layer.

13. A liquid crystal display according to claim 9, wherein the reflective area has a reaction accelerating layer for accelerating the reaction of the polymeric component.

14. A liquid crystal display according to claim 13, wherein the reaction accelerating layer is a color filter layer including a polymerization initiator.

15. A liquid crystal display according to claim 9, comprising an alignment film for controlling the alignment of the liquid crystal which is not formed, through coating, on at least a part of the neighborhood of an interface between the pair of substrates and the liquid crystal.

16. A method of manufacturing a liquid crystal display having a plurality of pixel regions each having a reflective area which reflects light from the side of one of a pair of substrates provided opposite to each other and a transmissive area which transmits light from the side of the other of the pair of substrates toward the one of the pair of substrates, the method comprising the steps of:

sealing a liquid crystal including a polymeric component polymerized by ultraviolet light between the pair of substrates; and irradiating the liquid crystal in the reflective area and the liquid crystal in the transmissive area with ultraviolet light under predetermined respective irradiating conditions to polymerize the polymeric component, thereby forming an ultraviolet-hardened material which imparts light scattering capability to the reflective area.

17. A method of manufacturing a liquid crystal display according to claim 16, wherein the irradiating conditions comprise a condition that the irradiating intensity in the reflective area is higher than the irradiation intensity in the transmissive area.

18. A liquid crystal display comprising:

a pair of substrates provided opposite to each other;

a liquid crystal sealed between the pair of substrates;

a plurality of pixel regions each having a reflective area which reflects light from the side of one of the pair of substrates and a transmissive area which transmits light from the side of the other of the pair of substrates toward the one of the pair of substrates;

a reflective electrode formed in the reflective area on the other of the pair of substrates;

an insulation film formed on the reflective electrode and in the transmissive area;

a transmissive electrode formed on the insulation film in the transmissive area, wherein an ultraviolet-hardened material which is a product of polymerization of a polymeric component mixed in the liquid crystal with ultraviolet light, is formed in the neighborhood of an interface between the liquid crystal and the pair of substrates to control the alignment of the liquid crystal with alignment control capability that differently works in the reflective area and the transmissive area, wherein the ultraviolet-hardened material is formed by irradiating the liquid crystal in the reflective area and the liquid crystal in the transmissive area with ultraviolet light while applying different voltages thereto.

19. A liquid crystal display according to claim 18, wherein the transparent electrode extends into a part of the reflective area.

20. A liquid crystal display according to claim 19, wherein the transparent electrode has a shape which allows the alignment of the liquid crystal to be controlled at least in the reflective area.

21. A liquid crystal display according to claim 19, wherein the transparent electrode has an opening in a predetermined shape at least in the reflective area.

22. A liquid crystal display according to claim 21, wherein the predetermined shape is a linear, radial, polygonal or circular shape.

23. A liquid crystal display according to claim 21, wherein the opening is formed only in the reflective area.

24. A liquid crystal display according to claim 18, wherein the insulation film includes a color filter layer.

25. A liquid crystal display according to claim 18, wherein the reflective electrode and the transparent electrode are electrically connected to each other.

26. A liquid crystal display according to claim 18, wherein the reflective electrode and the transparent electrode are connected to each other through a capacity.

27. A liquid crystal display according to claim 26, wherein the potential of the reflective electrode and the potential of the transparent electrode are different from each other.

28. A liquid crystal display according to claim 18, wherein the reflective electrode has an irregular surface which causes scatter reflection of light.

29. A liquid crystal display according to claim 18, wherein the reflective electrode has a substantially flat surface, the display further comprising a light scattering section for scattering light provided on the side of the reflective electrode where the one of the pair of substrates is located.

30. A liquid crystal display according to claim 18, wherein the liquid crystal is divided into a plurality of differently aligned domains in the pixel region.

31. A liquid crystal display according to claim 18, wherein an alignment film for controlling the alignment of the liquid crystal is not formed at least in a part of the neighborhood of the interface between the pair of substrates and the liquid crystal.

32. A liquid crystal display according to claim 18, further comprising a plurality of bus lines and a thin film transistor provided in the vicinity of an intersection between the plurality of bus lines, wherein the reflective electrode is formed on the bus line or the thin film transistor.

33. A liquid crystal display according to claim 18, further comprising a plurality of bus lines and a thin film transistor provided in the vicinity of an intersection between the plurality of bus lines, wherein the reflective electrode is formed integrally with a source electrode of the thin film transistor.

* * * * *